United States Patent
McNally

(10) Patent No.: US 9,932,110 B2
(45) Date of Patent: Apr. 3, 2018

(54) METHOD FOR INSTALLING AN OBJECT USING AN UNMANNED AERIAL VEHICLE

(71) Applicant: Jonathan McNally, Boulder, CO (US)

(72) Inventor: Jonathan McNally, Boulder, CO (US)

( * ) Notice: Subject to any disclaimer, the term of this patent is extended or adjusted under 35 U.S.C. 154(b) by 189 days.

(21) Appl. No.: 14/806,645

(22) Filed: Jul. 22, 2015

(65) Prior Publication Data

US 2016/0023761 A1 Jan. 28, 2016

Related U.S. Application Data

(60) Provisional application No. 62/027,255, filed on Jul. 22, 2014.

(51) Int. Cl.
| | | |
|---|---|---|
| B64C 39/00 | (2006.01) | |
| B64C 39/02 | (2006.01) | |
| H02G 1/02 | (2006.01) | |
| G05D 1/00 | (2006.01) | |
| H02G 7/00 | (2006.01) | |

(52) U.S. Cl.
CPC ......... *B64C 39/024* (2013.01); *G05D 1/0094* (2013.01); *H02G 1/02* (2013.01); *B64C 2201/024* (2013.01); *B64C 2201/128* (2013.01); *B64C 2201/146* (2013.01); *B64C 2201/182* (2013.01); *H02G 7/00* (2013.01)

(58) Field of Classification Search
CPC ............ B64C 39/024; B64C 2201/128; B64C 2201/182; B64C 2201/146; B64C 2201/024; G05D 1/0094; H02G 1/02; H02G 7/00
See application file for complete search history.

(56) References Cited

U.S. PATENT DOCUMENTS

| | | | | |
|---|---|---|---|---|
| 7,398,946 B1* | 7/2008 | Marshall | ............ | B60L 11/1816 191/10 |
| 7,543,780 B1* | 6/2009 | Marshall | ............... | B64C 39/024 244/110 G |
| 8,028,952 B2* | 10/2011 | Urnes, Sr. | ............... | B63B 35/50 114/261 |
| 8,251,307 B2* | 8/2012 | Goossen | ............... | B64C 39/024 244/23 C |
| 8,783,607 B2* | 7/2014 | Allen | ........................ | B64F 1/02 114/241 |
| 8,864,069 B2* | 10/2014 | McDonnell | ............. | B64C 25/68 244/110 C |
| 8,944,373 B2* | 2/2015 | Dickson | .................... | B64F 1/02 244/110 C |
| 9,422,139 B1* | 8/2016 | Bialkowski | .............. | B66D 1/48 |
| 9,639,091 B2* | 5/2017 | Carpenter | ............. | B64C 39/024 |
| 9,663,234 B1* | 5/2017 | Hanlon | .................... | B64D 1/12 |

* cited by examiner

*Primary Examiner* — Richard Chang

(57) ABSTRACT

A method for using an unmanned aerial vehicle to install objects on wire and catenary structures is described. The method includes tagging the location, attaching the object to the UAV, navigating the UAV to the position, attaching the object, testing the attachment, releasing the object, inspecting the attachment, and returning the UAV to the ground. Sensors, flight control systems, means for attachment, and variations of embodiments of the methods, systems, and mechanical devices are described.

20 Claims, 19 Drawing Sheets

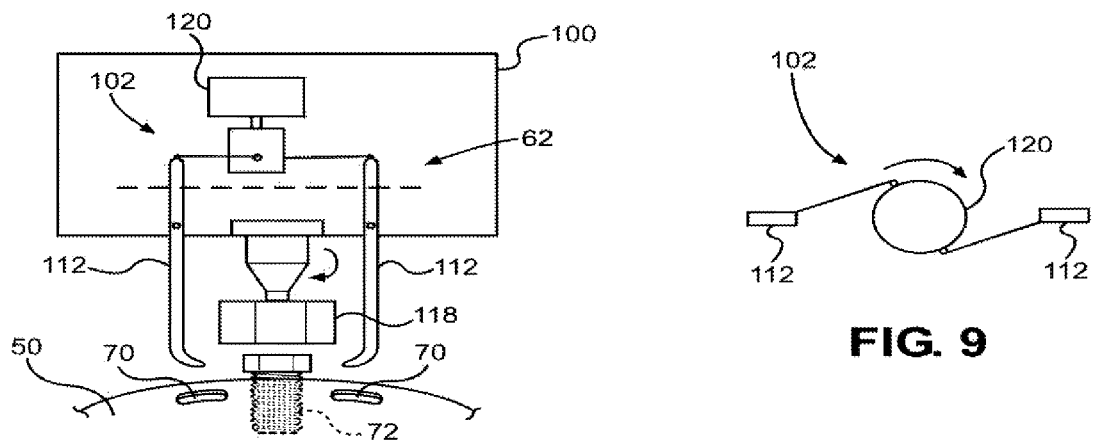
FIG. 8  FIG. 9
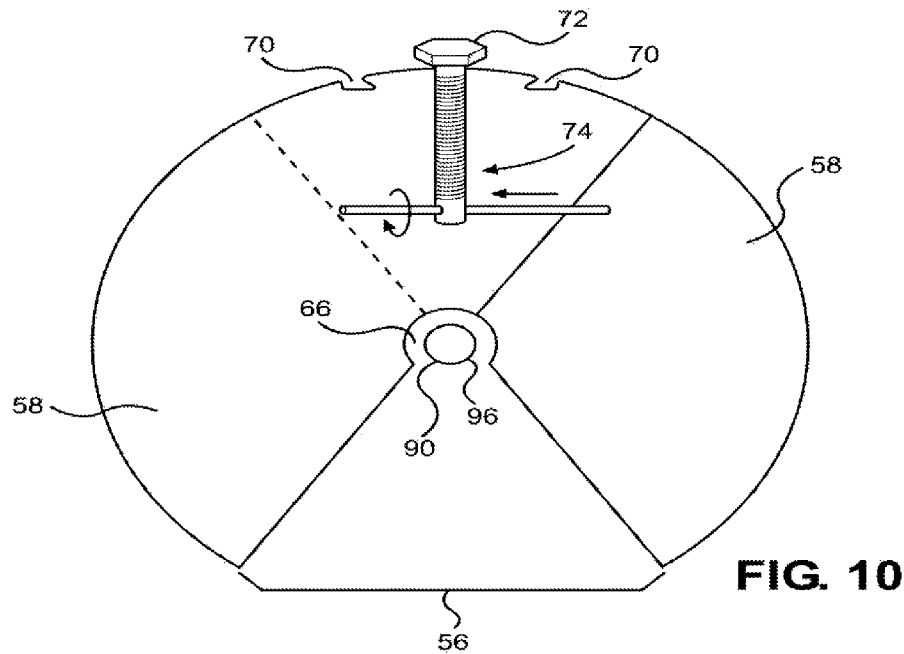
FIG. 10

METHOD FOR INSTALLING AN OBJECT USING AN UNMANNED AERIAL VEHICLE

This application claims the benefit of U.S. Provisional Patent Application No. 62/027,255, filed on Jul. 22, 2014, titled "Method For Installing An Aerial Marker Using An Unmanned Vehicle" which is incorporated by reference herein in its entirety for all purposes.

FIELD OF THE INVENTION

The present invention is in the technical field of aerial operations on utility infrastructures. More particularly, the present invention pertains to the field of installation of objects upon cables spans or catenary structures.

DESCRIPTION OF RELATED ART

Wires and cables are a major threat to low flying aircraft and birds. Due to the limitations of vision and the inconspicuous nature of wires, wires can be invisible until it is too late and a collision occurs, usually with disastrous results. Wires are particularly dangerous to helicopters; which, owing to their unique capabilities and mission requirements, often operate at low altitudes. Wire strikes are a leading cause of helicopter accidents worldwide with the FAA estimating that wires claim an average of 100 helicopters a year. When a wire strike occurs, 40-50% of the resulting accidents are fatal. The hazards include, but are not limited to: various catenary wires and catenary support structures, electrical transmission wires, telephone wires, fiber optic cables, suspension cables on bridges, aerial trams and ski lifts, guy wires supporting towers, etc. Aerial warning devices, typically orange spheres, are installed to provide a visual warning to pilots and wildlife.

FAA Advisory Circular AC 70/7460-1K Obstruction Marking and Lighting requires that "Any temporary or permanent structure . . . that exceeds an overall height of 200 feet (61 m) above ground level . . . should normally be marked and/or lighted." Additionally, markers may be recommended or required on lower objects that present an extraordinary threat such as wires across canyons, lakes, rivers, and valleys. In areas where the target hazard is low enough and ground access is practical, ground based installation platforms have been utilized: ladders, lifts, cranes, cherry pickers, etc. These methods are relatively economical and safe. However, ground based installation is often impractical or impossible due to the hazard's height, geographical remoteness, or the underlying surface (lakes, rivers, rough terrain, etc).

One solution that has seen limited use involves a climbing or crawling robot. The robot is attached to a segment of suspended cable and provides a remotely controlled installation platform with some degree of automation. This method appears to be effective and safe, but cumbersome, time consuming, and impractical for many installations. The robot must be attached and detached to the cables; which can be a challenging affair; and cannot overcome obstacles on the wire, thus limiting it to one span of cable at a time.

Another similar method attaches a human worker (lineman) to the cable by means of harnesses, ropes, pulleys, and the like. The lineman then climbs or crawls along the cable and manually installs the aerial warning device. The cumbersome and time-consuming drawbacks of this method should be obvious and are similar to the crawling robot method, except with the additional hazard of involving a human life suspended on live high voltage transmission wires.

Still another method involves manually attaching a rolling/sliding aerial marker at one end of the span (tower). Workers on the ground reposition the marker by means of ropes and pulleys. The marker is installed automatically with a firm downward force on the rope, by means of internal springs and clamping mechanisms. This method has seen limited use and is somewhat cumbersome; and, as with previously described methods, is often impractical or impossible. Additionally, the design of the automatic fastening mechanism is somewhat complex and significantly heavier than simplified designs which is undesirable as weight is a crucial concern for objects suspended on overhead cables.

In practice, helicopters are the preferred and primary installation platform for aerial warning devices, especially in remote and challenging areas where there is no other option. A commonly used aerial installation method involves a helicopter hovering in close proximity to the target wire with a lineman sitting outside the helicopter on a platform. The lineman separates a hollow clamshell-split sphere and places it over the wire, positioning it in a central mounting location, securing it by means of bolts, fasteners, hand tools, bushings, clamps, rods, preformed wire grips, helical armor rods, and/or pliable wire wraps. Another common method uses a preassembled, singular, solid sphere with a "W" shaped bottom for a drop-into-slot, tool-free installation, with the lineman manually installing wire wraps, preformed wire grips, helical armor rods, clamps, and/or fasteners to secure the device to the line. These methods have proven effective and have enjoyed a surprisingly good safety record.

However, the helicopter installation methods are performed at great risk to the pilot and lineman involved. The helicopter installation method requires highly trained and exceptionally skilled linemen and pilots and is one of the toughest jobs they are asked to accomplish. In the event of an emergency such as mechanical failure or a wire strike with the helicopter blades, the lineman and pilot will most likely die. There is also risk of significant damage to property and lost revenue due to damaged utility infrastructure. In addition to the pilot and crew, the operating and insurance costs of the helicopter make this method extremely expensive. The high cost of installation of aerial markers is generally covered by a utility company who then passes the costs on to their customers. Due to the high cost of installation, many threatening objects are left unmarked leaving a substantial risk to low flying aircraft and birds.

In addition to aerial markers objects such as: bird diverters, vibration dampers, armor rod reinforcements, and other objects can also benefit from the methods and apparatuses described below.

SUMMARY

In addressing many of the problems experienced in the related art, such as those relating to expensive equipment, manual wire wrapping, installation obstructed by trees and infrastructure, and placing personnel at dangerous heights above the ground; the present disclosure provides a safe, inexpensive, and automated apparatus and method for lifting and attaching an aerial market to a cable span under a variety of landscape and infrastructure conditions by combining one or more of the following: a UAV (unmanned aerial vehicle), a flight control system modified for reverse thrust and bottom-tether conditions, a releasable hoist, automatic cable fasteners, an aerial marker ball, proximity sensors for navigating to a target location, gimbal systems for stabilization, and cable contact sensors, among other things.

This method may include attaching an aerial marker to a UAV platform adapted for hoisting the aerial marker to the target location. The method may further include the step of augmenting the flight control system so that the UAV platform remains maneuverable under payload conditions unique to a marker installation process. The method may further include the step of navigating the UAV platform having vertical and horizontal propulsion to approximately the target location. The position of the UAV platform may be measured relative to the target location using one or more proximity sensors. The method further includes the steps of releasing the aerial marker from the UAV platform, inspecting the installation, and returning the UAV to the ground.

Embodiments of apparatuses are described in the detailed description which accomplish the described method in complex detail.

OBJECTS AND ADVANTAGES

The present disclosure can provide a number of advantages depending on the particular aspect, embodiment, and/or configuration. Embodiments of the present invention overcome the shortcomings of prior related art by; among other things; significantly lowering: acquisition, operating, relocation, and insurance costs relative to the use of helicopters; thereby driving down the costs related to installation of areal markers. Additionally, utilizing an UAV allows for safe and reliable installation of aerial markers without risking the lives of a pilot and lineman or expensive equipment. By increasing the scope and range of cost effective installation locations, the present invention will be a great benefit to aviation safety and wildlife.

None of the particular objects or advantages that follow must be entirely satisfied as they are non-exclusive alternatives and at least one of the following objects is met; accordingly, several additional objects and advantages of the present invention are:

(a) to provide a method for installing, servicing or replacing aerial markers without the use of helicopters, robot crawlers, or harnessed climbers;

(b) to provide a method for enhancing the flight control systems of a UAV to handle the laterally constrained and lift variations encountered in installation;

(c) to provide a method for combining the cable fastening and hoisting functions into one mechanism;

(d) to provide a method for providing a fine relative positioning system for the UAV platform for carefully placing an aerial market onto a cable span in the presence of wind, cable sway, GPS error, impairments to visibility experienced by ground personnel controlling the installation;

(e) to provide a method for emulating installations by trained personnel operating on a helicopter platform by providing for fine actions and feedback mechanisms, such as contact detectors, proximity sensors, inspection steps, testing for firm attachment, and other key steps, which give confidence in the installation and multiple contingencies, such as unlatching a partially latched cable fastener;

(f) to provide a method for reducing the error requirements on positioning through the use of mechanical guiding elements such as feelers, gimbals, V-guides, and gapped transverse openings in the marker ball;

(g) to provide a method for self-optimizing catenary maps such as: RTK, LPS, Lidar and photogrammetric maps to improve location accuracy by comparing an installation layout to positioning data measured by an inertial navigation system, external sensors, and/or proximity sensors.

These and other objectives and advantages of the instant invention will become apparent from the following description taken in conjunction with the accompanying drawings wherein are set forth, by way of illustration and example, certain embodiments of the instant invention. The drawings are intended to constitute a part of this specification and include exemplary embodiments of the present invention and illustrate various objects and features thereof.

BRIEF DESCRIPTION OF THE DRAWINGS

The above, and other, aspects, features, and advantages of several embodiments of the present disclosure will be more apparent from the following Detailed Description as presented in conjunction with the following several figures of the Drawing.

FIGURES

Figure 1:
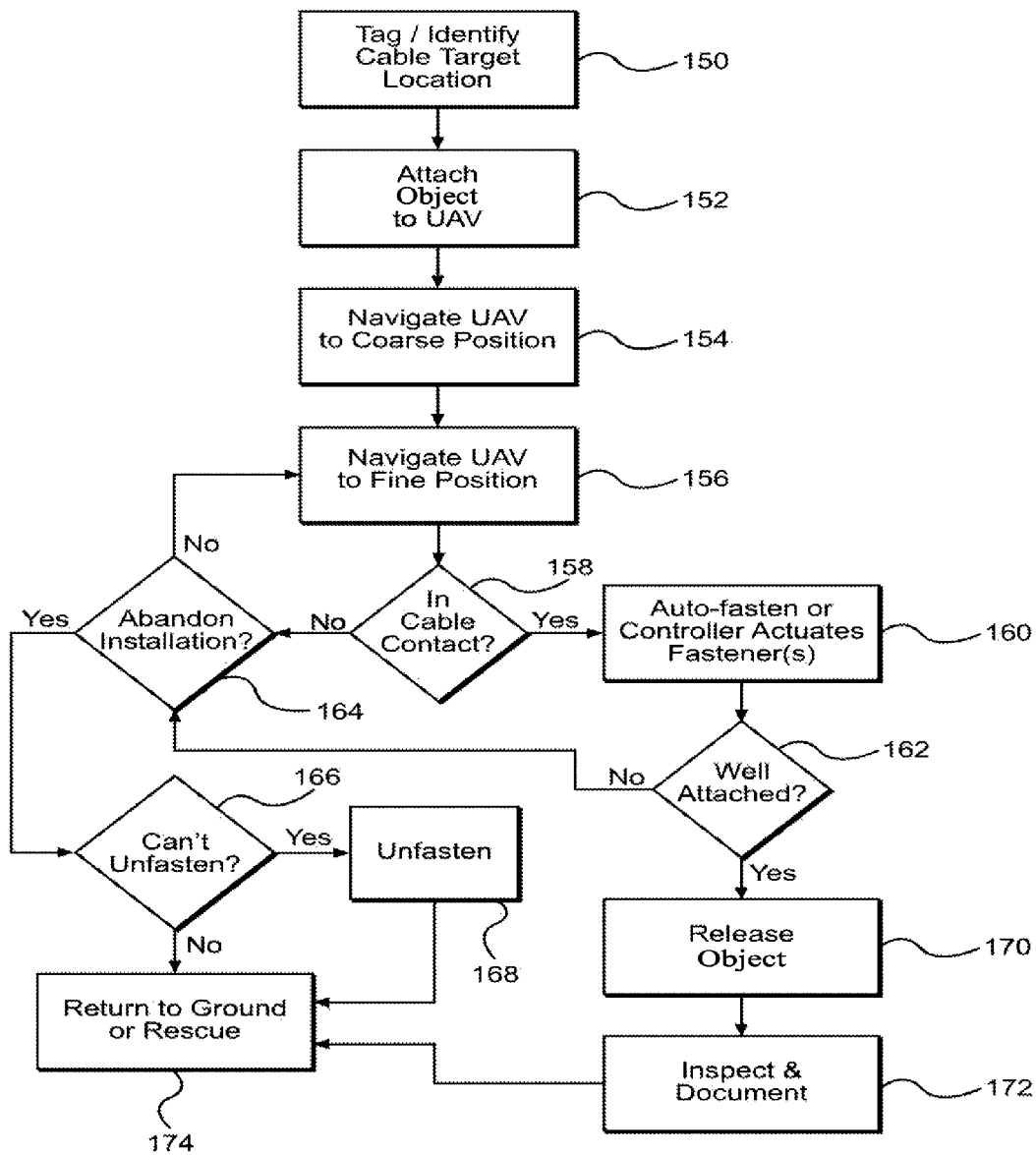

FIG. 1 (Sheet 1) illustrates a flow diagram for installing a gapped aerial marker using an unmanned vehicle, in accordance with an embodiment of the present disclosure.

Figure 2:
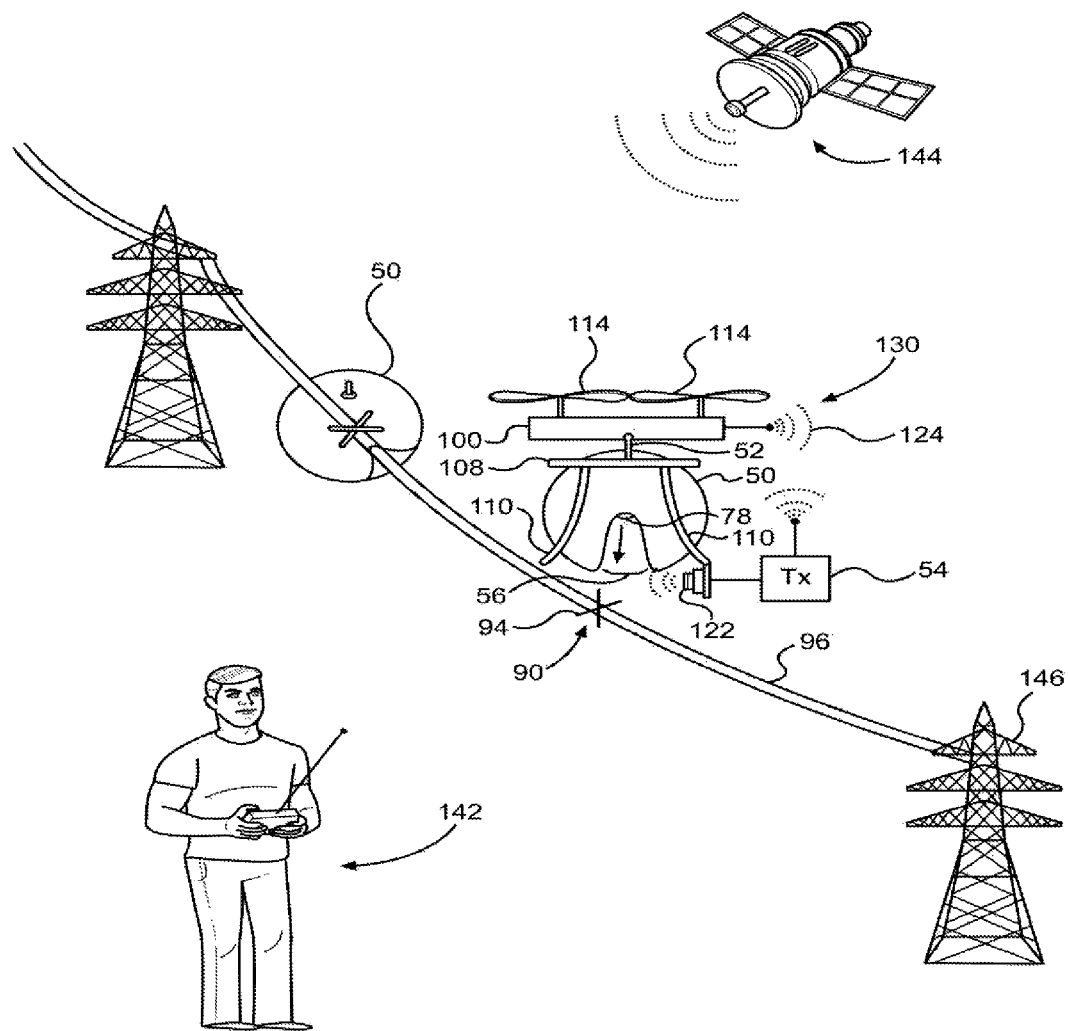

FIG. 2 (Sheet 2) illustrates a top perspective view of a typical scenario of installing an aerial marker, in accordance with an embodiment of the present disclosure.

Figure 3:
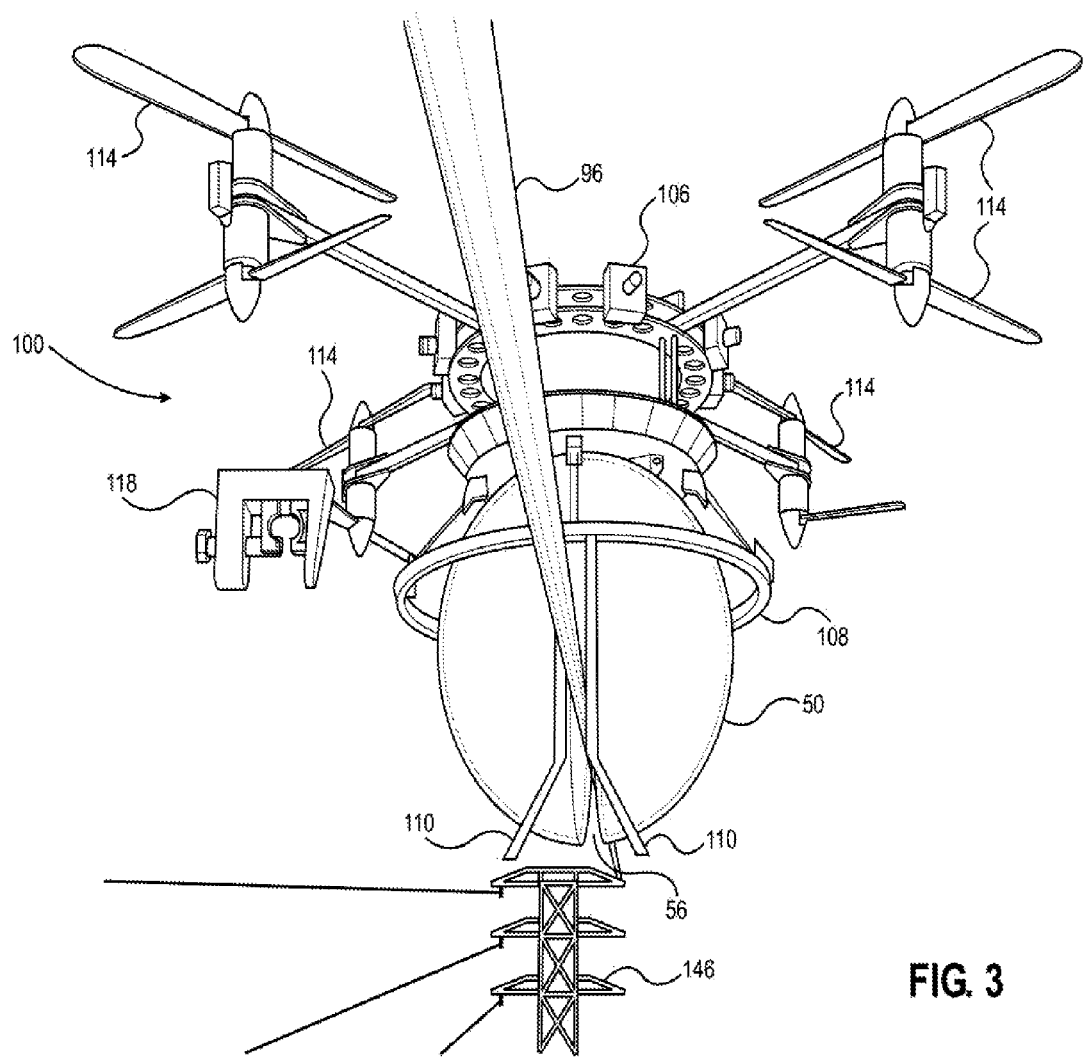

FIG. 3 (Sheet 3) illustrates a perspective view of an aerial marker held by an unmanned aerial vehicle (UAV), in accordance with an embodiment of the present disclosure.

Figure 4:
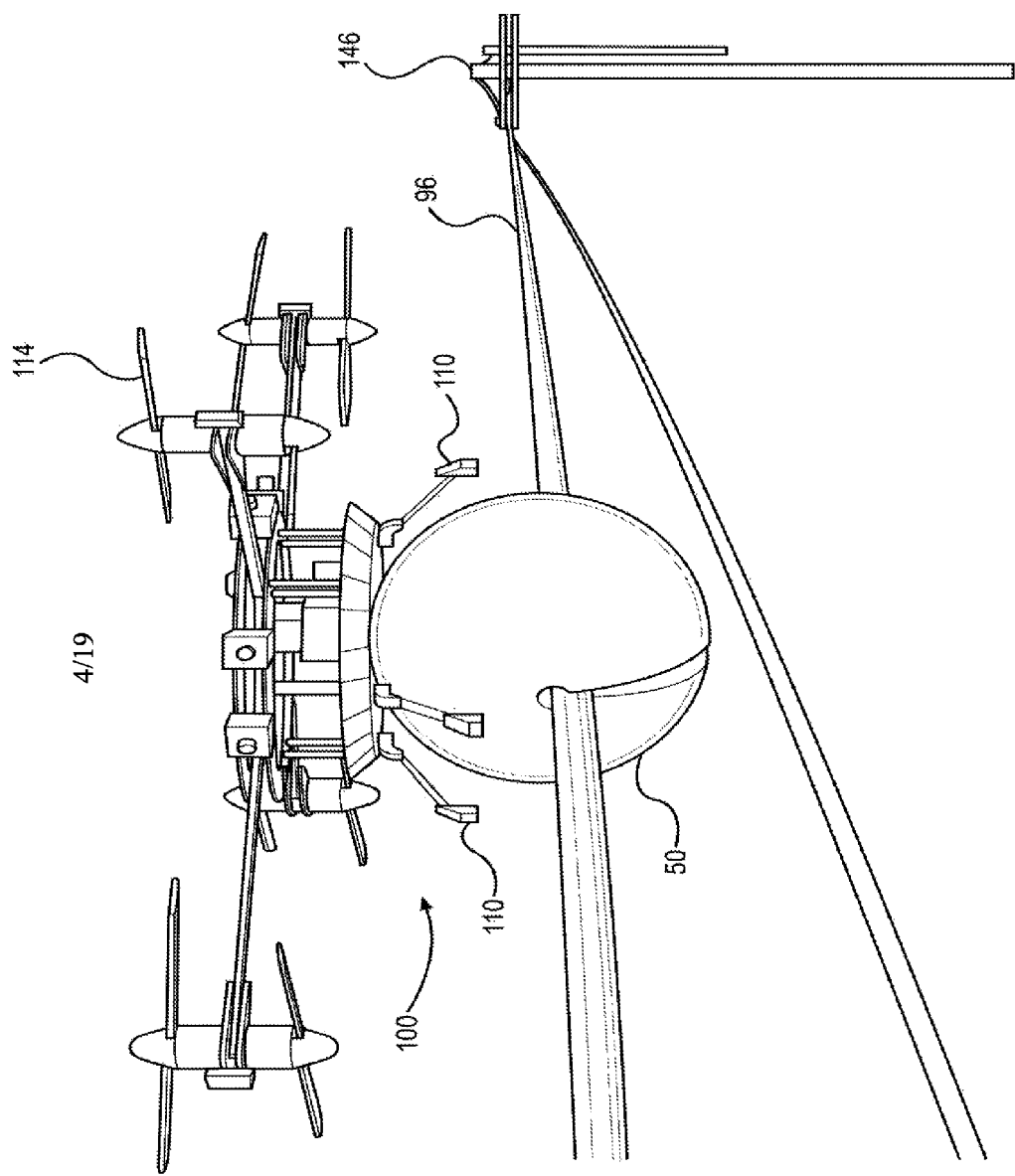

FIG. 4 (Sheet 4) illustrates a perspective view of an aerial marker held by a UAV, in accordance with an embodiment of the present disclosure.

Figure 5:
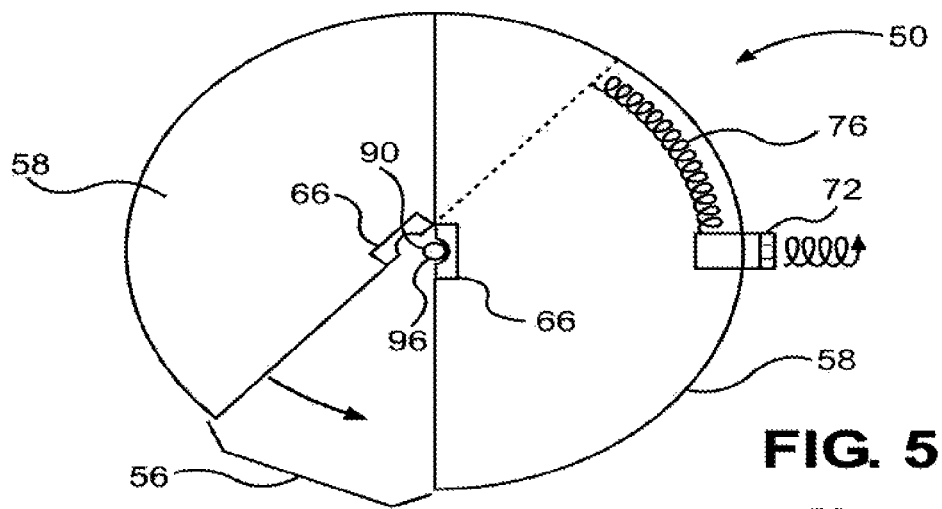

FIG. 5 (Sheet 5) illustrates a front view of a nested hemispherical marker with collar clamps, in accordance with an embodiment of the present disclosure.

Figure 6:
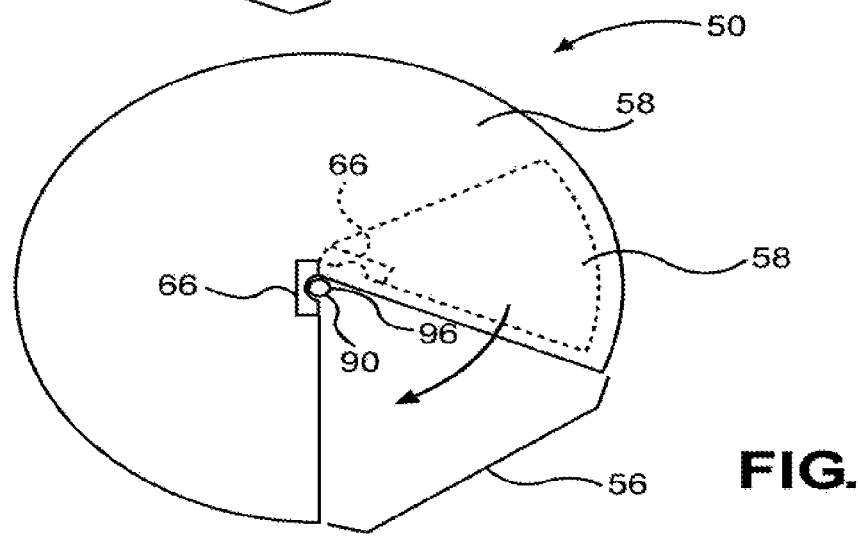

FIG. 6 (Sheet 5) illustrates a front view of a marker ball with unequal nested semi-spheres, in accordance with an embodiment of the present disclosure.

Figure 7:
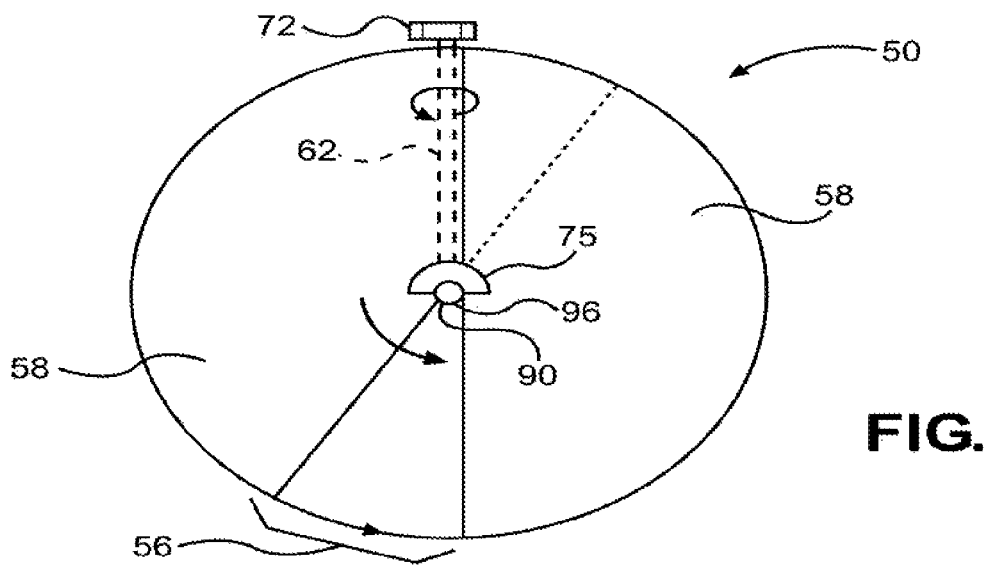

FIG. 7 (Sheet 5) illustrates front view of a nested hemispherical marker ball with a radial fastener actuator, in accordance with an embodiment of the present disclosure.

FIG. 8 (Sheet 6) illustrates front view of a single-point hoist and actuator, in accordance with an embodiment of the present disclosure.

FIG. 9 (Sheet 6) illustrates a top view of a release servo for a single-point hoist and actuator, in accordance with an embodiment of the present disclosure.

FIG. 10 (Sheet 6) illustrates a front view of an actuating bolt pulling together two halves of a marker ball, in accordance with an embodiment of the present disclosure.

Figure 11:
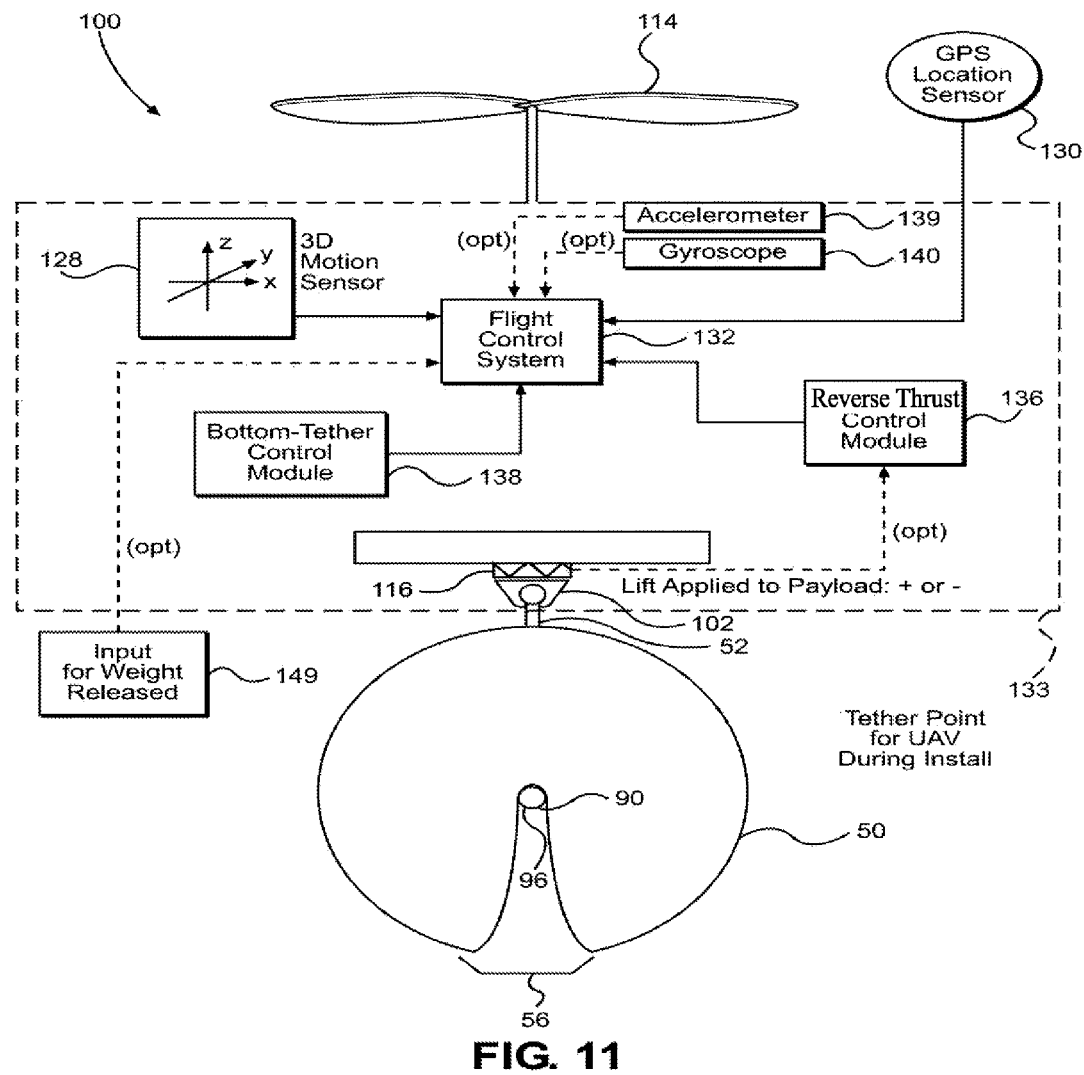

FIG. 11 (Sheet 7) illustrates a mixed diagram of a flight control system for a UAV platform, in accordance with an embodiment of the present disclosure.

Figure 12A:
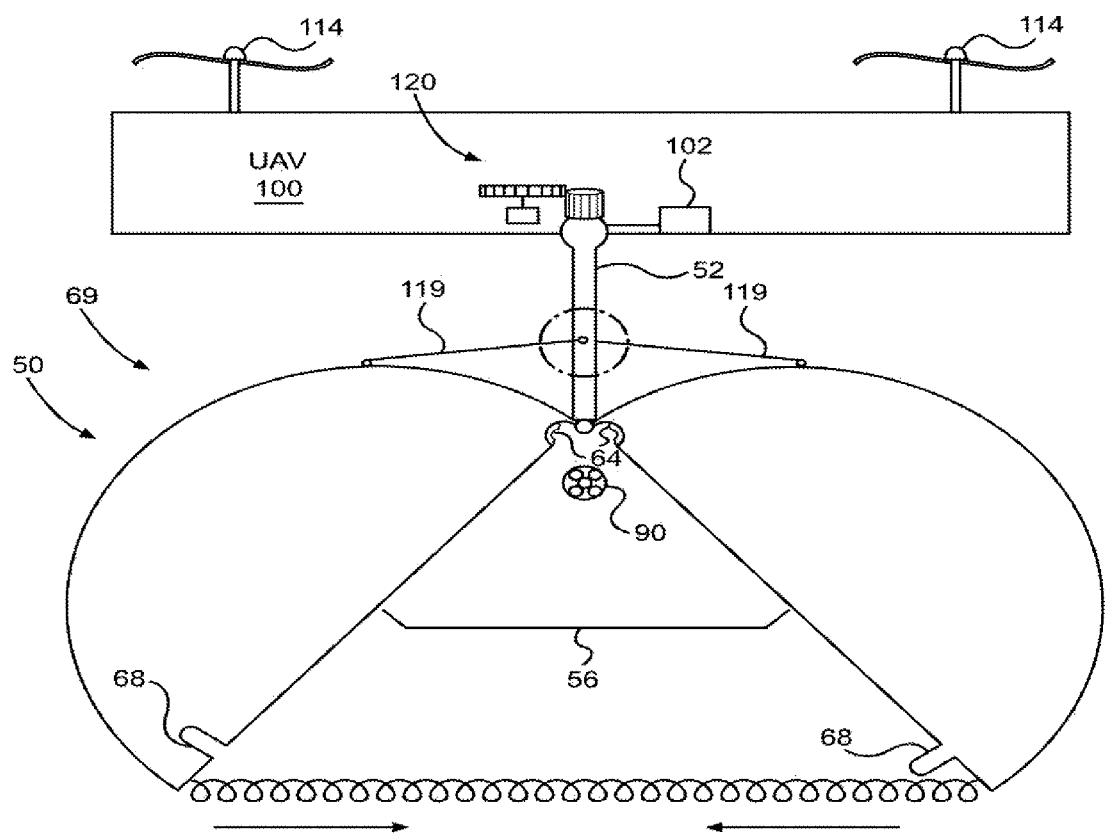

FIG. 12a (Sheet 8) illustrates a front view of an open clamshell marker and a platform with release servo, in accordance with an embodiment of the present disclosure.

Figure 12B:
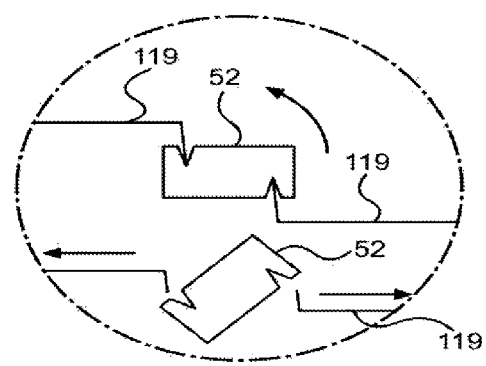

FIG. 12b (Sheet 8) illustrates a top view of a release servo, in accordance with an embodiment of the present disclosure.

Figure 13:
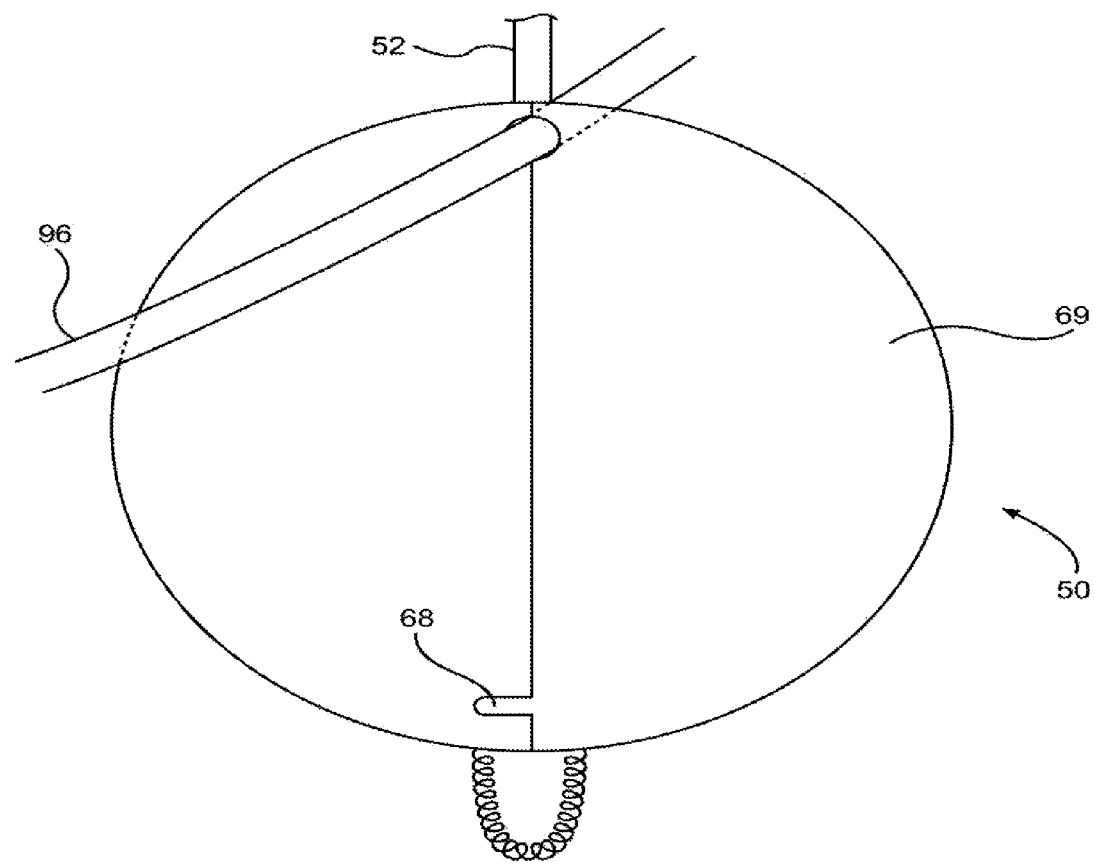

FIG. 13 (Sheet 8) illustrates a front view of a closed clamshell marker, in accordance with an embodiment of the present disclosure.

Figure 14:
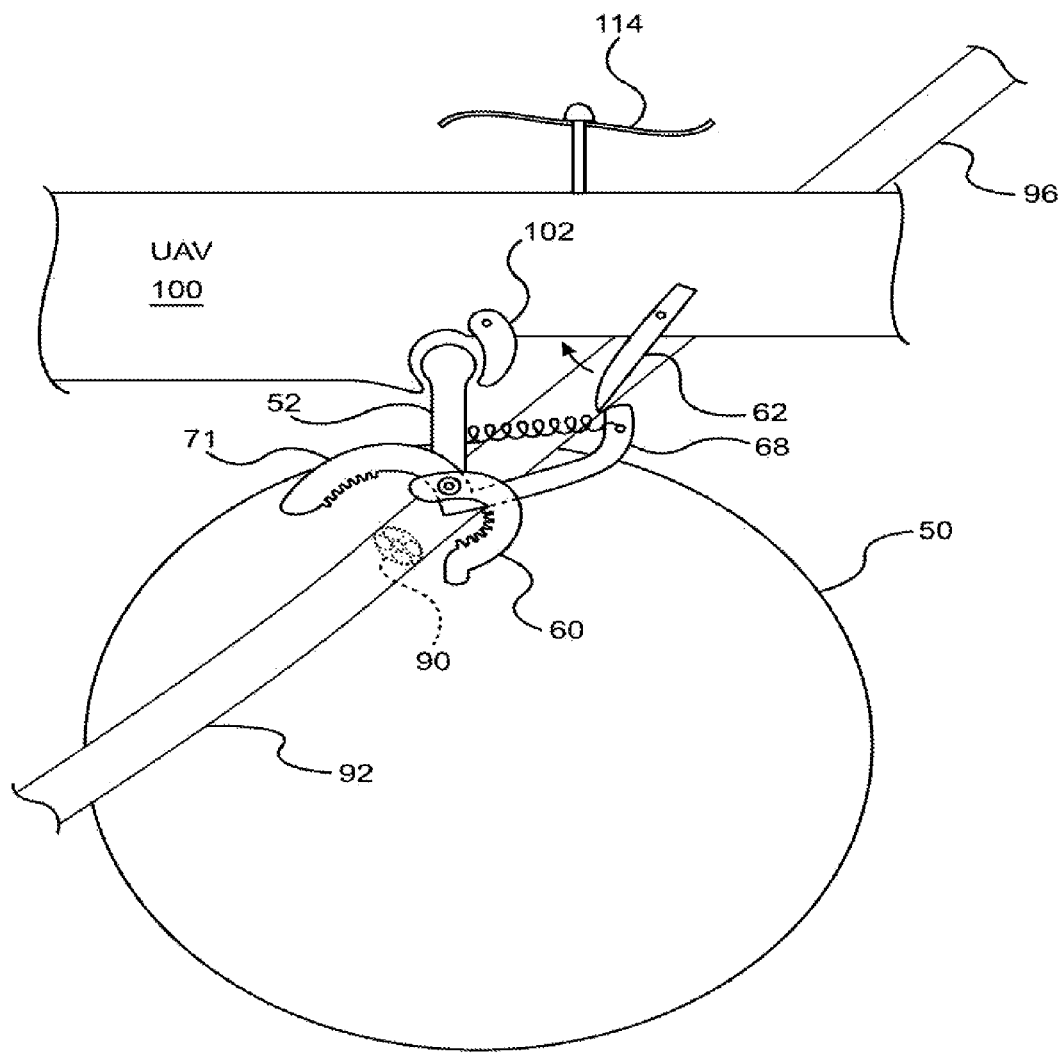

FIG. 14 (Sheet 9) illustrates a perspective view of a suspended aerial marker with integrated hoist and actuator, in accordance with an embodiment of the present disclosure.

Figure 15:
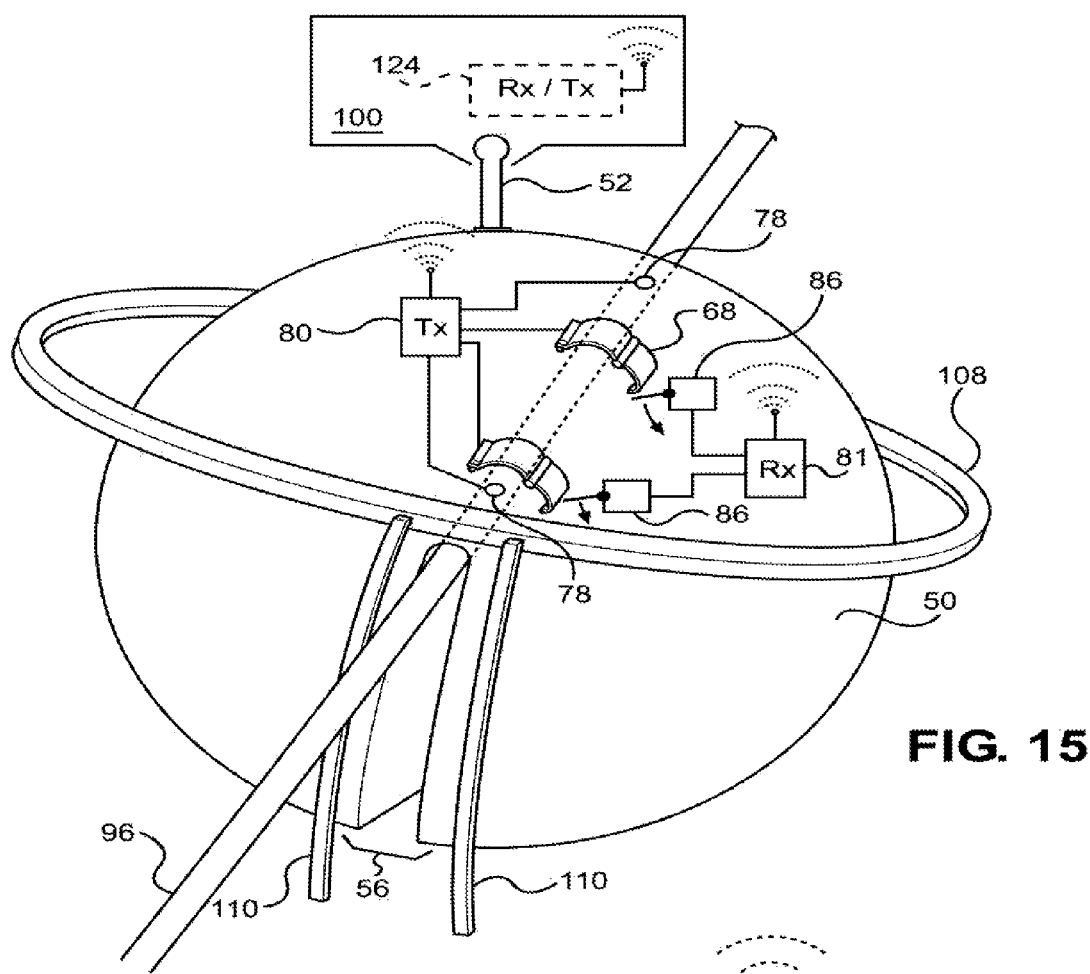

FIG. 15 (Sheet 10) illustrates a view of an electrically actuated and sensed fastening latch, in accordance with an embodiment of the present disclosure.

Figure 16:
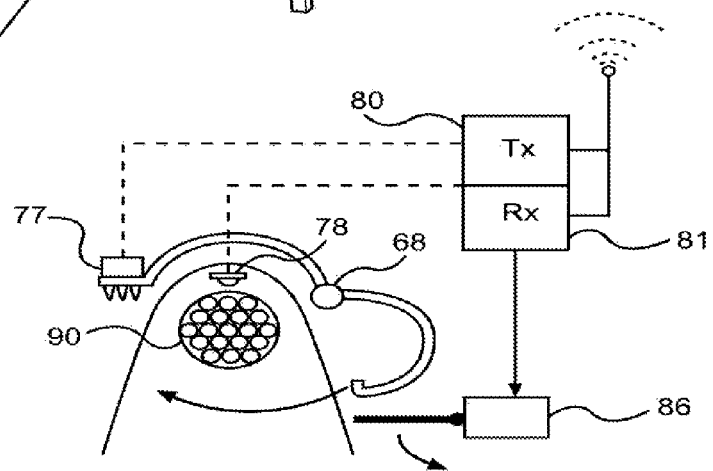

FIG. 16 (Sheet 10) illustrates a close-up view of an electrically actuated and sensed fastening latch, in accordance with an embodiment of the present disclosure.

Figure 17:
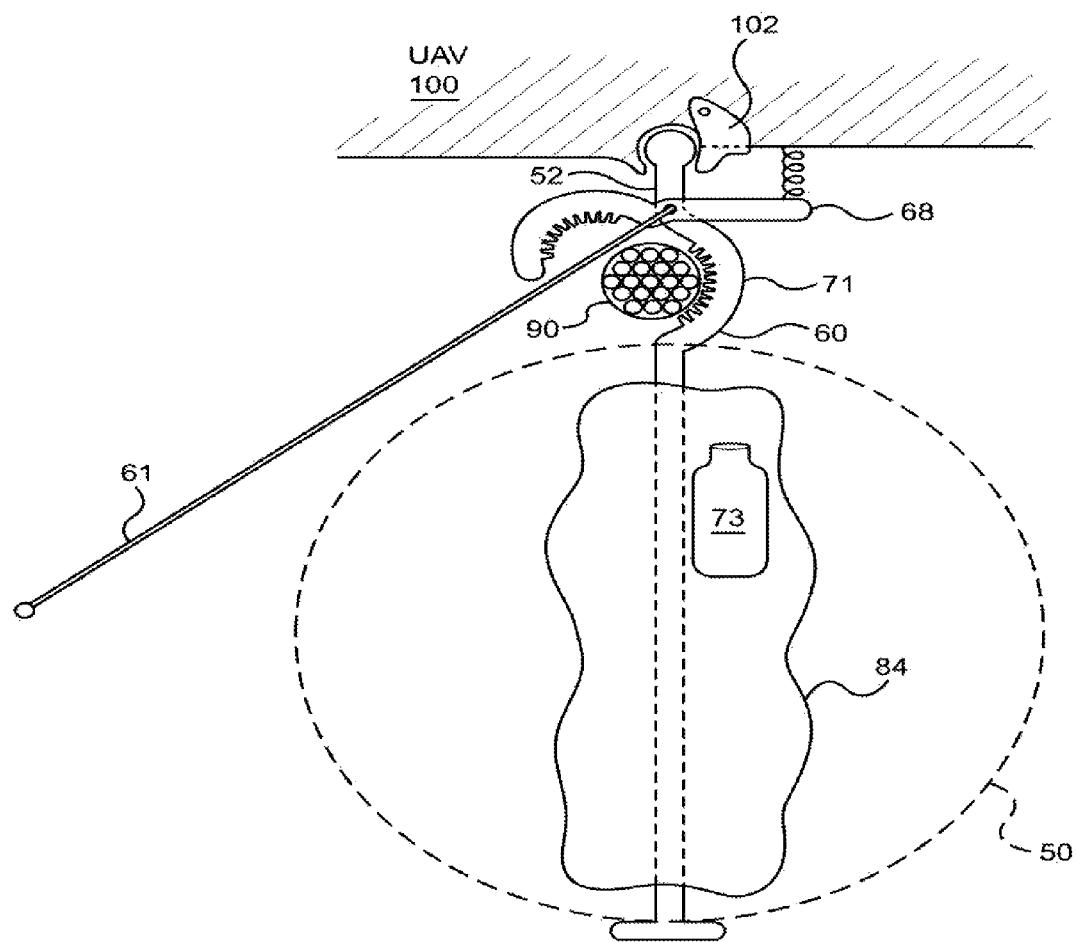

FIG. 17 (Sheet 11) illustrates a front view of an inflatable aerial marker with mechanical feeler, in accordance with an embodiment of the present disclosure.

Figure 18:
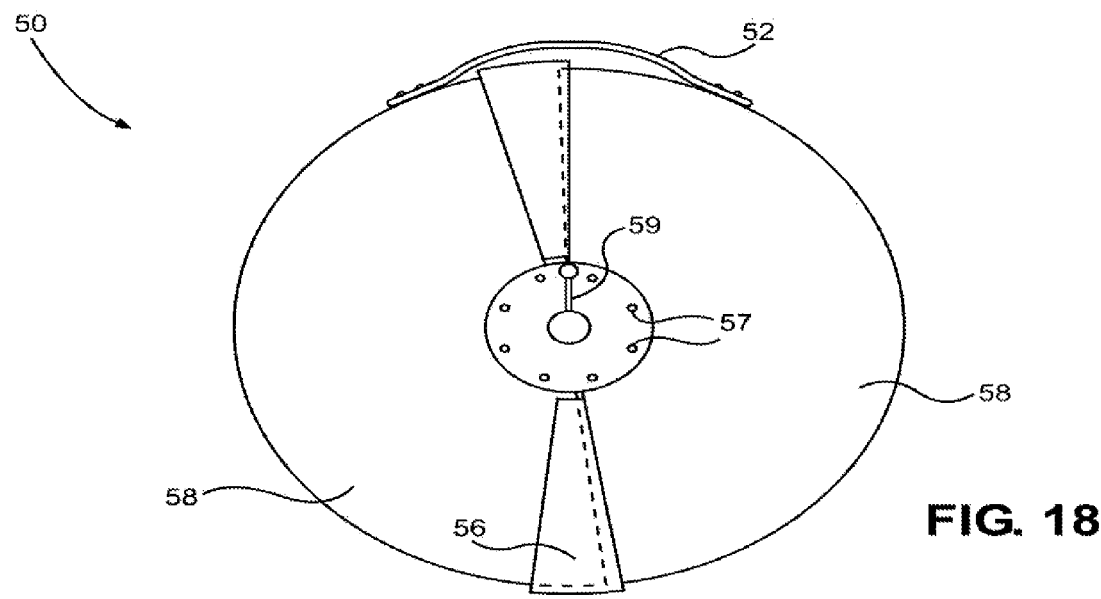

FIG. 18 (Sheet 12) illustrates a front view of a nested hemispherical marker with a locking pin, in accordance with an embodiment of the present disclosure.

Figure 19:
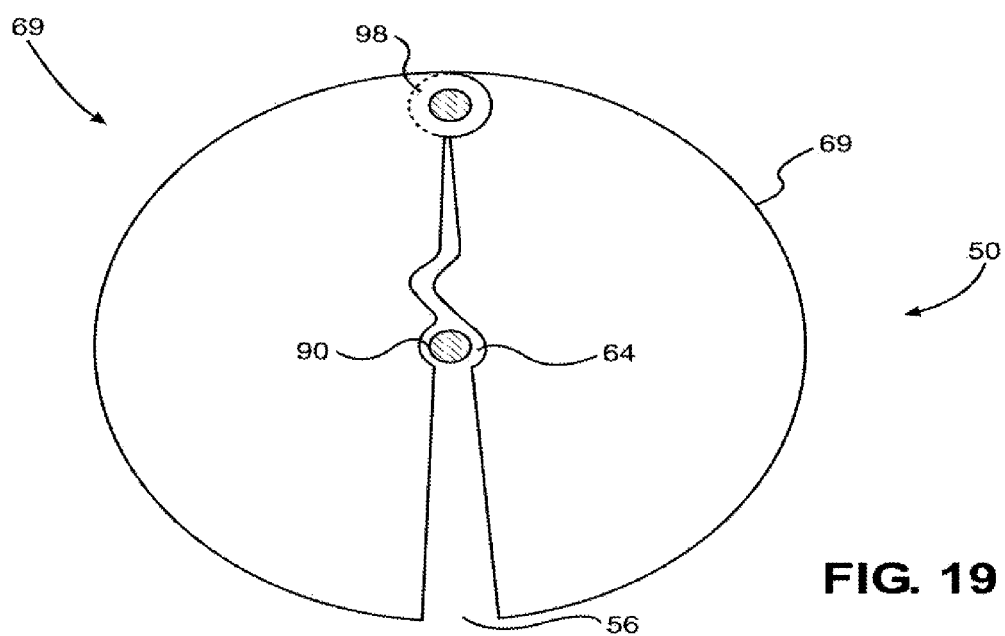

FIG. 19 (Sheet 12) illustrates a front view of a hinged clamshell aerial marker, in accordance with an embodiment of the present disclosure.

Figure 20:
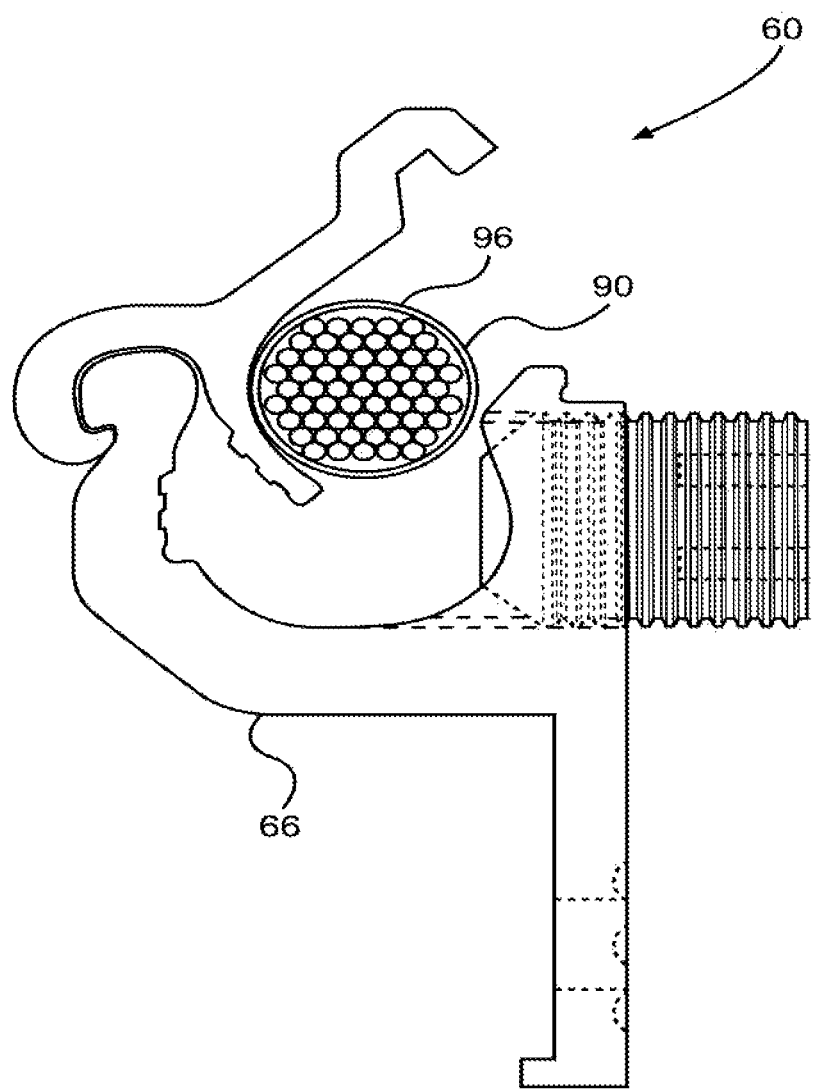

FIG. 20 (Sheet 13) illustrates a front view of a cable fastener using a collar clamp, in accordance with an embodiment of the present disclosure.

Figure 21:
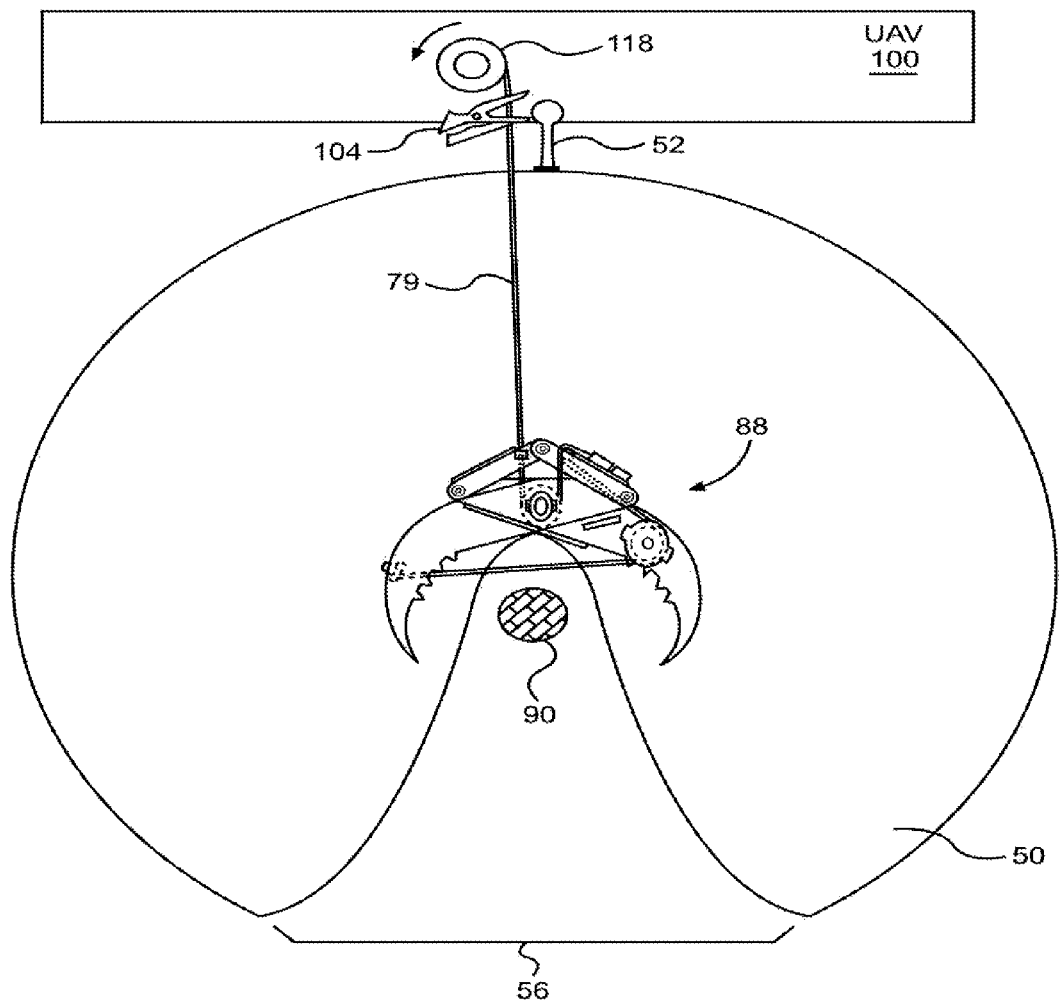

FIG. 21 (Sheet 14) illustrates a front view of a grapple-style fastener actuated by a take-up spool, in accordance with an embodiment of the present disclosure.

Figure 22:
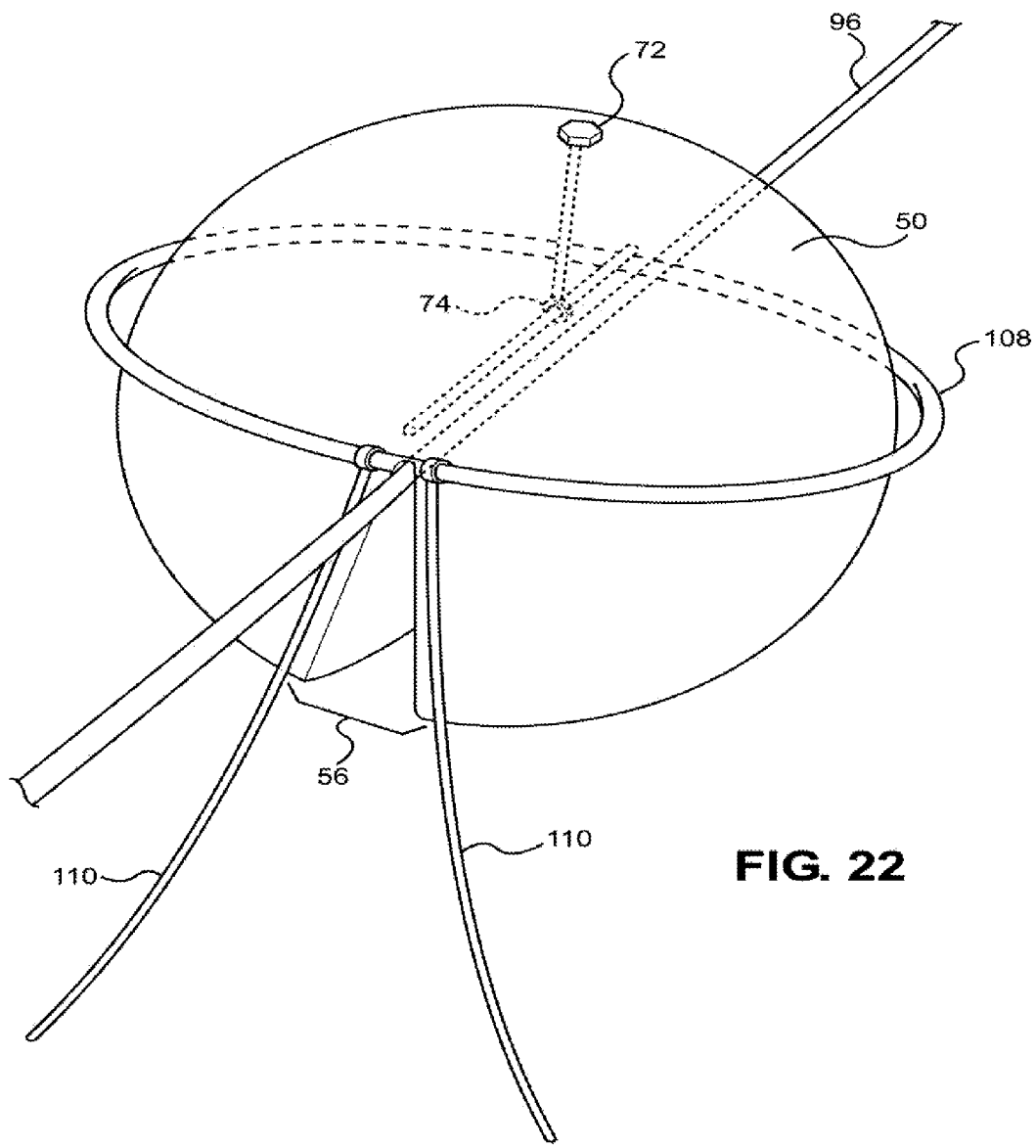

FIG. 22 (Sheet 15) illustrates a perspective view of an aerial marker with an axial clamping mechanism, in accordance with an embodiment of the present disclosure.

Figure 23:
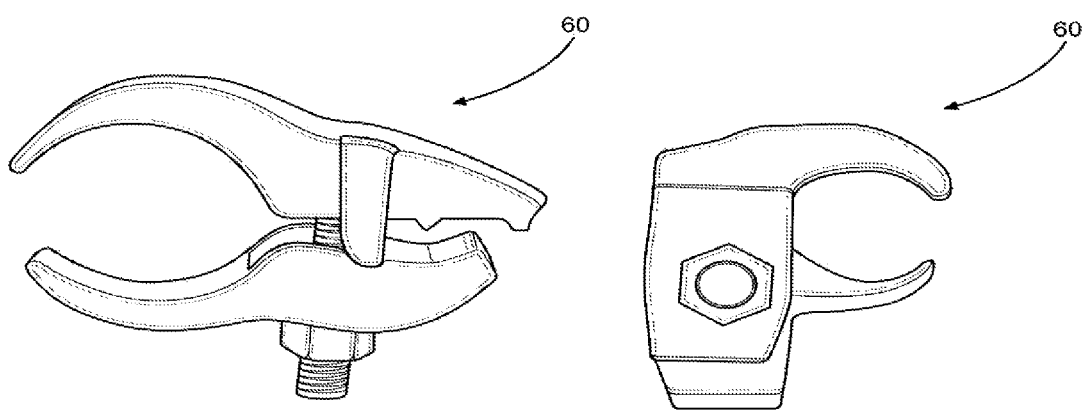

FIG. 23 (Sheet 16) illustrates a front view of a cable fastener designed for clamping conduit, in accordance with an embodiment of the present disclosure.

Figure 24:
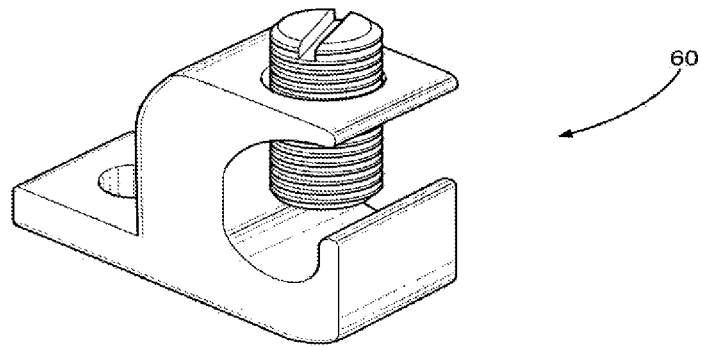

FIG. 24 (Sheet 16) illustrates a front view of a cable fastener designed for lay in, in accordance with an embodiment of the present disclosure.

Figure 25:
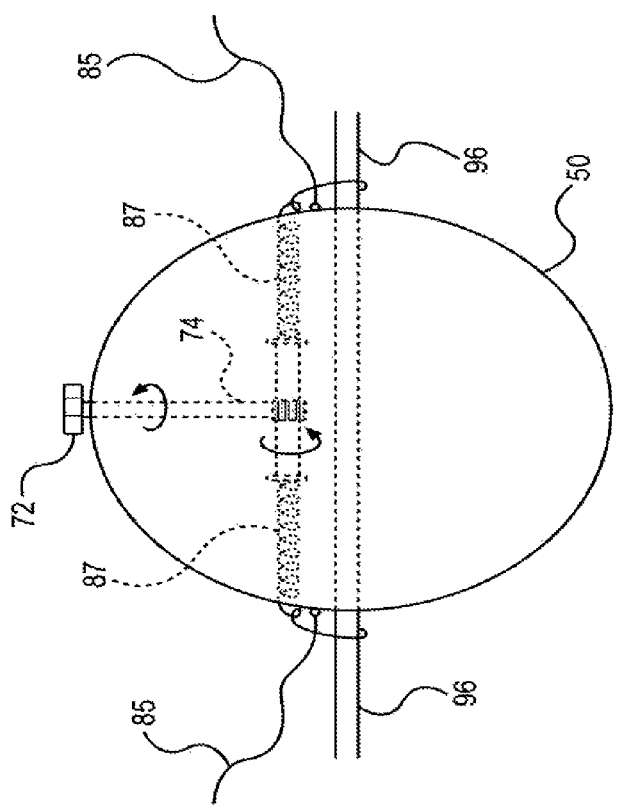

FIG. 25 (Sheet 17) illustrates a side view of a threading auger for wire wrapping to the cable span, in accordance with an embodiment of the present disclosure.

Figure 26:
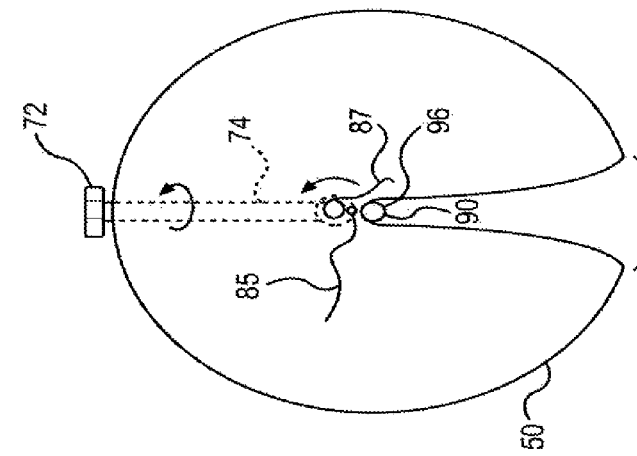

FIG. 26 (Sheet 17) illustrates a front view of a threading auger for wire wrapping to the cable span, in accordance with an embodiment of the present disclosure.

Figure 27:
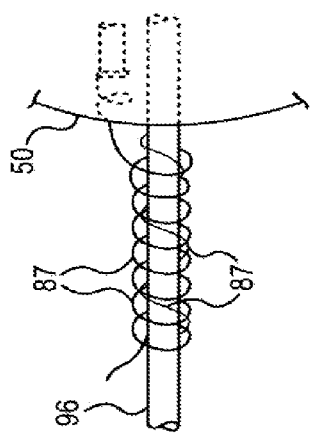

FIG. 27 (Sheet 17) illustrates a close up view of a threading auger and a wire wrapped to the cable span, in accordance with an embodiment of the present disclosure.

Figure 28:
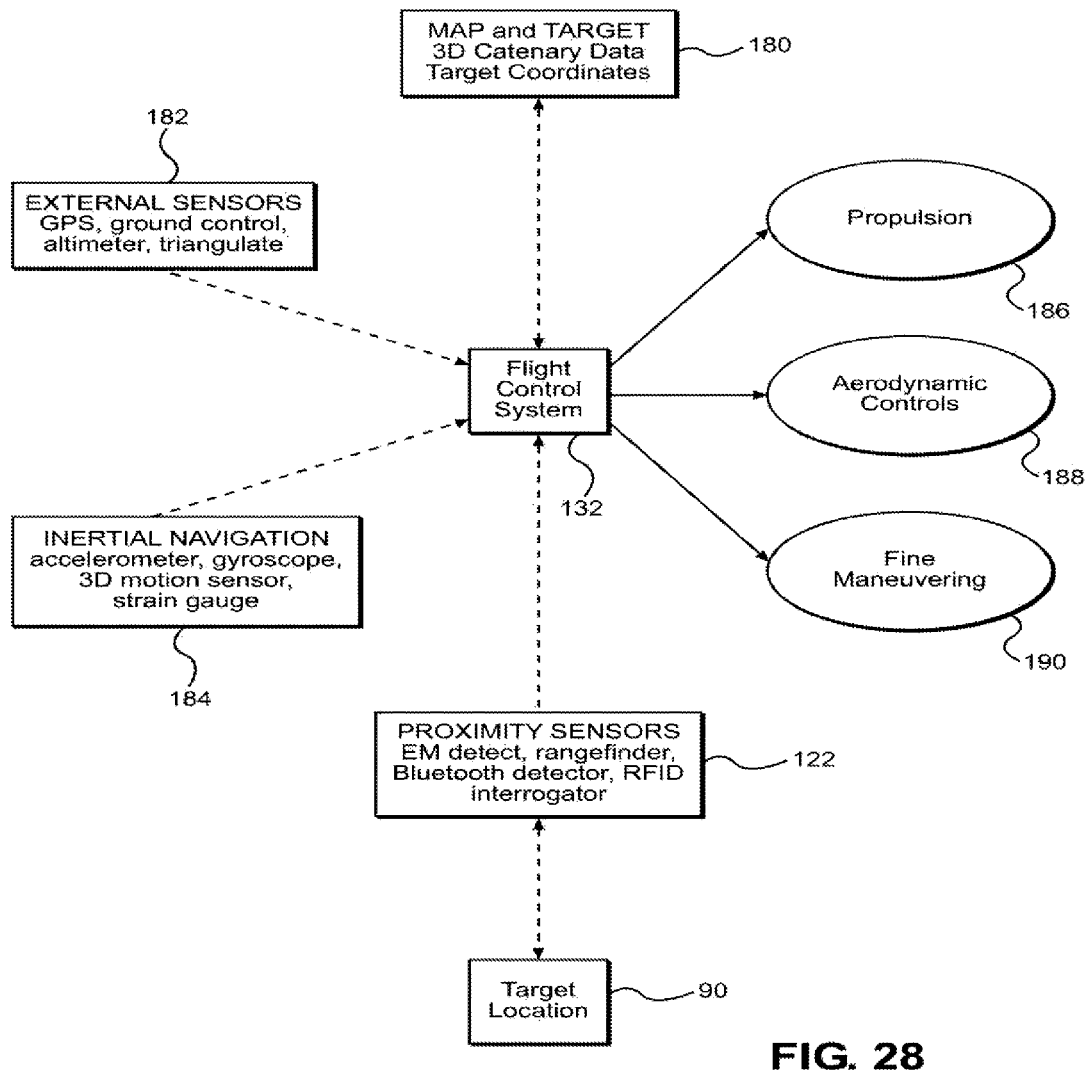

FIG. 28 (Sheet 18) illustrates a functional diagram of flight control including navigation and mapping, in accordance with an embodiment of the present disclosure.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims; each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.3, or 5.5 to 10, or 2.7 to 6.1.

For the purposes of promoting an understanding of the principles of the present invention, reference will now be made to the embodiments illustrated in the drawings and specific language will be used to describe the same.

Referring now to FIGS. 1 and 2, shown in FIG. 1 is a flow diagram for an embodiment of a method for installing an object on a wire or catenary structure using an unmanned vehicle, which may comprise the first step 150 of tagging cable span 96 at target location 90 with a cable tag 94, where it is desired to install an object 50 using an unmanned aerial vehicle (UAV) platform 100. Cable tag 94 may comprise paint, a Bluetooth beacon, a magnetic material, a visible flag, a bar code, an RFID tag, or other sensible indicator for a target location 90 for the installation of an object 50. The object 50 is shown as an aerial marker and may be referred to as such, but it may be any object necessary to attach to a cable or catenary structure, such as: aerial markers, bird diverters, vibration dampers, armor rod reinforcements, and other objects that can benefit from the methods and apparatuses described below.

Alternatively, tagging 150 may comprise identifying the XYZ coordinates of target location 90 and passing them to ground controller 142 or entering their data into UAV platform 100. One method for accomplishing this would be to use 3D Mapping and modeling. Various sensors such as photogrammetry, Lidar, or infrared can be used to hyper-precise and accurate geo-referenced 3D terrain modeling of catenary structures that have centimeter—level absolute accuracy in XYZ coordinates. This 3D model can then be loaded in the unmanned aerial vehicle's (UAV) flight control system (FCS) and the real-time sensed position of the structure can be compared to the saved model to locate where it is desired to install an object 50. Other identifiers may be used, such as a sound or light beacons, so long as they provide a sensible indication that equipment and personnel can use to move an object 50 into contact with a cable span 96.

A flight control system can be a system controlling propulsion, speed, direction, attitude, fine maneuvering and other parameters by receiving inputs from inertial sensors, external sensing and control, and proximity sensors regarding location, relative position, acceleration, motion, direction, altitude, speed, fuel/battery conditions, environmental data, user inputs, and similar data.

In embodiments of the present invention, the UAV platform may require specific modification to the flight control system (FCS) in order to maintain maneuverability under at least one of the following payload conditions: UAV lift requirements are reduced by the object resting on the cable span; the responsiveness of UAV is altered by its bottom being tethered to the cable span; downward pressure is desired to seat the marker onto cable span; side pressure from a centering guide tilts the payload; and rotation in the horizontal plane modified or enhanced yaw control is necessary to align with the cable span.

A unique challenge when utilizing a UAV to install an object on a cable span may be the variation in lifting force through the hoisting member as readouts from positioning sensors (e.g. GPS) and the cable itself fluctuate many inches over time and the flight control system tries to maintain a constant position. Additionally, once the cable span is contacted and fastens to the aerial marker, the FCS may become confused because the UAV can no longer autonomously establish a position in space, leading to a loss of attitude control, a running out of thrust reserve, and a failure to remain in an upright position. For example, as the marker is lowered and contacts centering mechanical guides, a side force will be placed on the UAV platform, which may require a lateral shift in the position of the platform to re-center the platform.

Continuing with FCS augmentation, solving the unique challenges of installing aerial markers with a UAV may require the addition of bottom-tether and reverse thrust module algorithms to take the additional constraints of a bobbing cable and bottom-tethering into account. The FCS may be pre-programmed to detect and automatically initiate variable flight control modes that ensure precise aircraft control throughout the changing flight regime. The addition of a solid-state accelerometer and/or gyroscope, if not already contained in the FCS, may enable a fine, relative positioning sensor that positions the marker onto the target location and avoids dependency on GPS inaccuracies. Also, a strain gauge in line with the hoisting member may successfully allow a modified FCS to maintain upright stability in the UAV platform while accounting for instrument error, cable span movement, and touching mechanical centering guides or feelers. These modifications are addressed more below.

Tagging 150 may also be performed by a tagging drone (not shown) prior to dispatching the UAV platform 150, or be done by the drone simultaneously with attachment of the object.

Continuing with FIGS. 1 and 2; in one embodiment; the first or second step 152 may comprise releasably attaching an object 50 to UAV platform 100 through hoisting member 52 pivoting at the approximate centerline of object 50, which may be shaped as a sphere and brightly colored to catch the attention of nearby aircraft. Alternatively, a multipoint hoisting structure (not shown) may be used, such as a two or more point structure or a carriage that provides stabilization or other functions such as electrical connections or mechanical actuation. However, a single-point pivot may advantageously allow the payload to sway so that the flight control system (FCS, not shown) can tilt platform 100 in response to wind or lateral thrusting by attached rotors 114. A rigidly attached payload offset from the lift center may limit maneuverability and waste propulsion energy. A preferred hoisting member 52 for attaching the object 50 to the platform 100 is an electronically stabilized and controlled gimbal mount, which may allow for precise control of the: pan, tilt, roll, vertical shift, and horizontal shift of the object 50 mounted to the platform 100. The gimbal mount would allow automatic coarse stabilization of the aerial marker in one or more axes (ie Auto horizon leveling). Additionally, the stabilized gimbal mount could allow for precise maneuvering of the marker onto the target attachment point. This fine maneuvering may be accomplished automatically via algorithms in the electronic gimbal controller and/or be manually commanded from a ground station/controller. Even in turbulence and shifty wind conditions, the UAV would be allowed to buck and move about in the wind while the marker remains precisely stabilized above the cable.

Once the object 50 is attached to platform 100, near-the-ground flight calibrations may be performed, such as entering presets like the payload weight, calibrating motional responses to flight maneuvering, checking location accuracy of GPS location sensor 130 mounted to platform 100 and receiving GPS satellites 144, and verifying that telemetry associated with ground controller 142 is working correctly.

Still referring to FIGS. 1 and 2, in one embodiment, the next step 154, may comprise navigating the UAV platform 100 and its payload approximately to the target location 90 under the thrust provided by rotors 114. Generally, electric motors may be preferred for driving rotors 114, but gasoline, other fuels, other drive mechanisms, and other kinds of propulsion such as a gas turbine or coaxial helicopter, or any method of VTOL (vertical takeoff and landing) lift with precise hovering capability such as: multi-rotors, tilt rotors, tandem rotors, traditional single rotor helicopters, airships, blimps, dirigibles, zeppelins, etc. may be utilized to propel the UAV platform 100. Navigating step 154 may be coarse and occur by manual control, or automatically according to a preset destination, by a GPS hold system that hovers the payload near the target position, by homing in on a cable tag 94, or by a combination of the above. It may be preferable to establish an initial position several meters away from target location 90 in order to prevent collision since it may be difficult for a ground controller several hundred feet away to discern how close the UAV platform is to, for example, power lines. Also, GPS accuracy may be limited to ±1 m or more, depending on satellite accessibility and receiver sophistication. Once in coarse target position, on-board cameras (not shown) and/or proximity sensor 122 and attached proximity transmitter 54 may assess the position of UAV platform 100 relative to cable span 96, find the target location if it is physically tagged, survey the area for nearby obstructions and wind, and measure positional variations over time, preparing to make contact with cable span 96.

Continuing, positioning step 156 may comprise, in an embodiment, maximizing the allowable positioning error through the use of one or more mechanical guiding elements, improving absolute positioning, improving the FCS (not shown) for reverse thrust and bottom-tethered conditions, improving relative positioning using mounted proximity sensors 122, slowly climbing above the target location 90, aligning a transverse opening 56 with cable span 96, and then lowering marker 50 for contact with the cable. First, guiding elements such as transverse opening 56 in the underside of the object 50, downward-pointing V-guides 110, and mechanical feelers (not shown) may widen the 'mouth' of the object 50 and thereby relax the necessary error requirements for contacting cable span 96. Next, improving absolute positioning may comprise using GPS in combination with ground-based sensors, ground-based control, an altimeter, and/or a triangulation receiver.

The flight control system can be improved to remain stable and accurate under reverse thrust conditions (e.g. when the weight of the object 50 and perhaps some of the platform 100 are resting on the cable span) and under bottom-tethered conditions (when the bottom of the platform 100 is tethered to the cable through hoisting member 52, or when mechanical guiding elements place side pressures on object 50) may comprise elements of an inertial navigational system that may include an accelerometer, 3D motion sensor, and/or gyroscope for quick responses to attitude changes, adding a vertically-oriented strain gauge (not shown) in series with hoisting member 52 to detect reverse thrust conditions, and including reverse thrust and bottom-tether control modules in the FCS. Also, including a laterally-oriented strain gauge (not shown) in contact with hoisting member 52 may detect the side pressure caused by contact with mechanical centering guides, and incorporating guiding responses into the bottom-tether control module (not shown) may maintain a centered approach to cable contact.

Continuing with fine positioning step 156 and referring to FIGS. 1 and 2, improving relative positioning may comprise using one or more of the following proximity sensors 122: Bluetooth, electromagnetic detection of a powered cable, an on-board camera, ground-based reporting (e.g. telescope), a laser/lidar rangefinder, RFID interrogation, mechanical feelers, infrared distance sensing, electro-optical, ranging sensors, Lidar, ultrasonic sensors, stereoscopic depth sensors, real time kinematic global positioning system (RTK GPS), local positioning systems (LPS), and/or sonar, optionally in conjunction with cable tag 94.

In one embodiment, a proximity detector 122 is mounted to V-guide 110, which is mounted to carriage ring 108 on platform 100. Using the above steps and elements, marker 50 may be maneuvered slowly toward cable span 96 while maintaining centered alignment and may finally seat at target location 90. In conclusion, a fine-positioning navigational mode combined with mechanical guiding elements and an improved FCS may provide an exceptional enhancement to fine position accuracy and maneuvering, thereby enabling the accurate and safe mounting of aerial marker 50 onto target location 90.

Proceeding to steps 158 and beyond in FIG. 1, still referring to FIGS. 1 and 2, in one embodiment, the step 158 of contacting the cable span, may comprise determining whether seating contact between object 50 and target location 90 may have occurred and, if so, halting the further movement of object 50, and which may include one or more of the following elements and steps: a membrane switch, an electrical switch, an imaging device detecting proper cable seating, an electrical indication of latching or contact, a mechanical indication of latching or contact, ground-based reporting, a report that the motional response of the UAV to maneuvering is different from its pre-contact response, sonic detection of latching, piezo-electric detection of latching, a motion sensor detecting a stop, an accelerometer detecting a stop, a gyroscope detecting a stop, a strain gauge detecting contact. If seating contact has occurred, then fastening step 160 may actuate a cable fastener. A cable fastener may be a clamp, screw mechanism, or another mechanism whether mechanically or electrically actuated, for securing an aerial marker to a cable span. If seating contact has not occurred, the process may proceed to an assessment to abandon, step 164, in which case either maneuvering (step 156) may resume or the installation (step 166) may be abandoned.

For example, a membrane switch 78 lining the narrowest part of transverse opening 56 may close when cable span 96 is properly seated, sending an electrical signal via a contact transmitter (not shown) to UAV transceiver 124, which then actuates a cable fastener (not shown) to secure object 50 to cable span 96. Alternatively, in another embodiment, a 3D motion sensor (not shown) on platform 100 may detect a stop and alert on-board cameras (not shown) to send an image of the contact area to ground controller 142, who may decide to actuate a cable fastener, step 160. In another embodiment not shown, a seated cable span 96 may contact a cable fastener that mechanically and automatically closes (fastening step 160) around target location 90 and fastens object 50 to cable span 96, emitting a sound characteristic of a latching cable fastener, and sonically detected by platform 100. Addition variations in detecting cable contact, actuating cable fastening, and detecting successful cable fastening (step 162) are possible and may be accomplished by a combination of platform 100, object 50, and ground controller 142 using the aforementioned elements and steps.

Proceeding to testing step 162, referring to FIG. 1, in one embodiment, an assessment may be performed as to whether secure attachment has occurred between the object 50 and cable span 96, which may include one or more of the following: the UAV platform measuring hoist strain greater than the weight of the marker, a report that the motional response of the UAV to maneuvering is different from its pre-contact response, collecting an image indicating secure cable attachment, an electrical indication of secure cable attachment based on latching sensors, a mechanical indication that a cable fastener has been latched, a sonic indication of secure cable attachment, ground-based inspection, actuating a fastener, or another method for indicating and transmitting that a secure attachment has occurred. If there is not secure attachment, the installation may proceed to an abandoning assessment step 164, and if there is secure attachment, the installation may proceed to releasing step 170.

For example, the step 160 of actuating a fastener by using an automated nutdriver 118 on platform 100 (see FIG. 8) may function as a successful test 162 of secure attachment, indicating an increase in torque required by actuating tool 118 to drive actuating bolt 72 at the end of travel. Addition embodiments of testing for successful cable attachment (step 162) are possible and may be accomplished by a combination of platform 100, marker 50, and ground controller 142 using the aforementioned elements and steps.

Continuing with FIGS. 1 and 2, in an embodiment, releasing step 170 may comprise releasing one end of hoisting member 52 at either the object 50 or at platform 100, once secure attachment has been verified in testing step 162. Releasing, step 170, may be initiated by object 50, by platform 100, or by ground controller 142. Mechanical and/or electrical signaling between the object 50, platform 100, and/or ground controller 142 may coordinate the releasing step 170, depending on the location of accomplishing elements and requisite information, such as which element is aware of a positive test result for testing step 162.

Continuing with FIGS. 1 and 2, in one embodiment, inspecting step 172 may comprise inspecting the installation by performing at least one of the following inspections: verifying that the weight of the payload is absent from the UAV platform, collecting and transmitting an image of the installation, receiving a return-to-ground message from the ground controller, receiving an indication of secure attachment, receiving an indication that a cable fastener has been latched, receiving a signal from the object 50 verifying that the hoisting member is released, or another method which works.

Continuing with FIGS. 1 and 2, in an embodiment, entering abandoning step 164 may comprise receiving a negative indication from testing assessment step 162 or receiving a negative indication from contacting assessment step 158. In either case, a decision may be made by ground controller 142 or platform 100 whether to proceed back to positioning step 156 or to abandon the installation and return to the ground via returning step 174. If a cable fastener has been incompletely latched but is unlatchable, then fastening assessment step 166 may cause the latch to unfasten through unfastening step 168, followed by returning platform 100 to the ground though returning step 174. If a cable fastener has been incompletely latched and is not unlatchable, then fastening assessment step 166 may direct platform 100 to the ground though returning step 174 if is free to disengage the cable span. If an incompletely latched cable fastener is not unlatchable and platform 100 cannot disengage the cable span, then a rescue operation may be necessary.

In summary, FIGS. 1 and 2 may illustrate a flow diagram and a top perspective view describing embodiments of a method for installing an object using an unmanned vehicle and showing the many advantages of this approach, such as providing all of the necessary actions and feedback presently accomplished by trained personnel elevated to dangerous heights using expensive equipment such as helicopters. By combining a UAV (unmanned aerial vehicle), a flight control system modified for reverse thrust and bottom-tether conditions, a gimbal hoist, automatic cable fasteners, an object that may have a wide-mouthed transverse gap or an end hook, proximity sensors for detecting the target location, and cable contact sensors, a complete method is described. Additional embodiments are described below using consistent element numbering across all of the drawings. The principles described above may be applied to the descriptions given below in order to inform subsequent embodiments as additional steps, elements, and features are described.

Now referring to FIG. 3, in an embodiment, an object 50 (in this case a gapped aerial marker) may be hoisted and positioned by UAV platform 100 and be centrally positioned on cable span 96 attached to tower 146. V-guides 110 may guide transverse opening 56 over cable span 96 as object 50 is lowered. Carriage ring 108 supporting V-guides 110 and suspended from platform 100 may rest on cable span 96 to provide reliable seating. Camera 106 mounted to platform 100 may provide important navigating, positioning, and inspecting functions as described above. Multiple rotors 114 attached to platform 100 may operate in at different speeds and blade pitch from each other, according to a flight control system (FCS, not shown), and may provide vertical take off and landing (VTOL) thrust as well as horizontal maneuvering. Actuating tool 118 extending out from platform 100 may swivel and contain motors or other actuating functions for securing cable fasteners (not shown) or completing other tool functions during an installation. For example, once a marker 50 has been deposited and released by platform 100, platform 100 may position itself beside marker 50 in order to test or complete its securement to cable span 96.

Referring now to FIG. 4, in an embodiment, UAV platform 100 may be mounted atop aerial marker 50 in a position for either completing cable fastening steps, servicing object 50, or preparing to remove the object 50 from cable span 96. Object 50 may be centrally positioned on cable span 96 attached to tower 146. V-guides 110 attached to platform 100 may extend widely to the side to offer protection for an object 50 during transport and provide landing pads for platform 100 when there is no payload. Multiple rotors 114 attached to platform 100 may operate at different speeds and blade pitch from each other, according to a flight control system (FCS, not shown), and may provide vertical take off and landing (VTOL) thrust as well as: horizontal maneuvering, reverse thrust to apply a force downward, and minimal balance thrust to allow the weight of the object 50 to settle on a wire. In an electric motor system, reverse thrust can be accomplished with rotors/propellers designed for both counter/clockwise motion (an airfoil that produces thrust up or down) and coreless motors that have very little inertia and can reverse direction very quickly. In a mechanically linked variable pitch system (traditional single rotor, coaxial, etc) this is accomplished by rigging the rotor blades to allow negative pitch angles. Reverse thrust allows UAVs to perform aerobatic maneuvers and even sustained inverted flight.

Referring to FIGS. 5-7, in one embodiment, FIG. 5 may comprise an object 50 formed of two nested semi-spheres 58 in the shape of hemispheres, slideable to close transverse opening 56 and circumscribe cable span 96. Circumferential drive screw 76 may be driven by actuating bolt 72 to close the left hemisphere against the right hemisphere and compress collar clamps 66 against target location 90. In an embodiment, FIG. 6 may comprise an object 50 formed of two nested semi-spheres 58 of unequal size, slideable to close transverse opening 56 and circumscribe cable span 96. Gravity or another mechanism may actuate to close the smaller semi-sphere against the larger semi-sphere and compress collar clamps 66 against target location 90. In an embodiment, FIG. 7 may comprise an object 50 formed of two nested semi-spheres 58 in the shape of hemispheres, slideable to close transverse opening 56 and circumscribe cable span 96. Radial fastener actuator 62, which may be a clamp, screw mechanism, whether mechanically or electrically actuated, for securing an aerial marker to a cable span may be driven by actuating bolt 72 to close the two hemispheres against each other and rotate sleeve clamp 75 around cable span 96 at target location 90.

Referring now to FIGS. 8-10, in one embodiment, FIGS. 8 and 9 may illustrate a mechanism for combining hoisting and actuating functions, simplifying the design and providing an approximately single-point location for both functions, which has the benefit of allowing object 50 to pivot and sway under UAV platform 100 as it is transported through the air. Stabilizer-grips 112 may extend from platform 100 and be actuatable by release servo 120 within hoist release mechanism 102. At object 50, grip receptacles 70 may be grasped by stabilizer-grips 112 through the action of release servo 120. Hoist release 102, shown in FIG. 9, may act through release servo 120 and pull stabilizer-grips 112 toward each other, removing them from grip receptacles 70. Referring to FIGS. 8 and 10, actuating tool 118 may extend over actuating bolt 72 and turn clamping mechanism 74 to close nested semi-spheres 58 together, clamping collar clamps 66 against cable span 96 at target location 90.

Referring to FIG. 11, in an embodiment, an enhanced flight control system (FCS) 133 for installing an object 50 onto target location 90 may comprise a basic FCS 132 fed with reverse thrust control module 136, bottom-tether control module 138, 3D motion sensor 128, and optional accelerometer 139, gyroscope 140, and payload data 149 inputs. Sense and control algorithms within control modules 136 and 138 combined with basic FCS 132 may provide sensing and control algorithms that create stability and positional accuracy when platform 100 is resting on target location 90, when the bottom of platform 100 is restrained by cable span 96, mechanical feelers, or guiding elements such as transverse openings 56. Additionally, strain gauge 116 sandwiched between platform 100 and hoist release 102 may vertically sense conditions indicating lifting forces through hoisting member 52 that are less than the weight of marker 50. Strain gauge 116 may also be configured, in another embodiment, to horizontally sense conditions indicating the onset of a side pressure indicating contact with mechanical guiding elements or feelers (not shown). Rotors 114 provide lift to platform 100, and GPS location sensor 130 may accompany a basic FCS 132 or be an optional input.

Referring now to FIGS. 12a, 12b and 13, in an embodiment, clamping clamshell 69 shown with a wide-mouthed transverse opening 56 may be releasably attached by a rotatable or electronic gimbal operated hoisting member 52 to UAV platform 100 though hoist release 102, where release servo 120 may disconnect clamshell stays 119 from hoisting member 52, releasing the two halves of the clamping clamshell 69 to latch with spring-loaded latch 68. Axial clamps 64 may compress target location 90 onto cable span 96, suspending the object 50 from cable span 96. Rotors 114 provide lift to platform 100. In this way, hoisting and cable fastening may be advantageously combined into one mechanism for simplicity and reduced weight.

Continuing, FIG. 14, in an embodiment, object 50 may be suspended by end hook 71 integrated with hoisting member 52 releasable by hoist release 102. Spring-loaded latch 68 may be released by fastener actuator 62 on platform 100 causing cable fastener 60 to clamp around target location 90 on cable span 96 having a cable diameter 92. Rotor 114 may provide lift to platform 100.

Referring to FIGS. 15 and 16, in an embodiment, fastening to cable span 96 may comprise descending object 50 through transverse opening 56 until contact detectors 78 signal contact transmitter 80 to alert platform 100 of proper cable seating via UAV transceiver 124. Contact detectors 78 can be a mechanical or electrical indicator of cable seating, a signal, a report, a sonic or mechanical detection, an imaging detecting a condition of cable seating, or switch, that indicates contact with or latching to a cable. UAV transceiver 124 may then direct fastening receiver 81 to release spring-loaded latches 68 by actuating fastening solenoid 86. After latching, latch sensors 77 may detect that spring-loaded latch 68 has securely latched and confirm secure attachment of object 50 to platform 100 prior to the releasing of hoisting member 52 connecting the two components. V-guides 110 extending from carriage ring 108 may effectively widen the mouth of an object 50, reducing the positional accuracy required of platform 100, relative to cable span 96.

Referring to FIG. 17, in an embodiment, mechanical feeler 61 may function as a mechanical guiding element for an inflatable embodiment of an object 50 suspended by end hook 71 and hoisting member 52 releasable by hoist release 102. Cable fastener 60 may be integrated with spring-loaded latch 68 to clamp target location 90. Deflated marker 84 may be inflated by compressed air 73 once cable attachment is secure and prior to the marker separating from platform 100.

Referring to FIG. 18, object 50 may be comprised of nested semi-spheres 58 where locking pin 59 and locking positions 57 establish initial transverse opening 56 and may be moved to different locking positions 57 for the nesting overlap desired after installation. Hoisting member 52 may attach to semi-spheres 58 in a slideable manner. Referring to FIG. 19, a clamping clamshell 69 may be hinged at hinge 98 and provide transverse opening 56. The "V" shape in the clamshell seam may prevent target location 90 from slipping up beyond a central mounting location, providing for a centrally mounted object 50.

Referring to FIG. 20, in an embodiment, cable fastener 60 may comprise collar clamp 66 in two pieces, the upper piece forming a wide-mouth entry for cable span 96 coming from the right side, and the upper piece rotating clockwise to fasten at target location 90.

Referring to FIG. 21, in an embodiment, actuating tool 118 may reel in take-up wire 79 to close grapple 88 around target location 90 without spinning UAV platform 100, as might occur while turning a drive screw. Advantageously, due to the lack of rotational actuation, there may be no need for any spin stabilizers in the attachment of marker 50 to platform 100. Object 50 may be suspended from platform 100 by hoisting member 52, and cutters 104 may sever take-up wire 79 once cable attachment is secure.

Referring to FIG. 22, in an embodiment, V-guides 110, attaching to carriage ring 108, and transverse opening 56 may guide an object 50 onto cable span 96 for attachment to cable span 96 by axial clamping mechanism 74 rotated by actuating bolt 72.

Referring to FIGS. 23 and 24, in embodiments, cable fastener 60 may be similar to those designed for clamping a conduit or a lay-in cable.

Referring to FIGS. 25, 26, and 27, in other embodiments, threading augers 87 positioned inside an object 50 may be driven by actuating bolt 72 through clamping mechanism 74 to spiral outward, thereby capturing wire wraps 85 and securing them to cable span 96 on either side of target location 90. Transverse opening 56 may guide cable span 96 into position. Wire wraps 85 may be attached to object 50, and the wrapping action may frictionally secure object 50 to a portion of cable span 96 not enclosed by object 50. Auger 87 may be refracted or removed through reverse action once wire wrap 85 is fastened. Alternatively, threading auger 87 may be applied from UAV platform 100 (not shown). In another embodiment not shown, auger 87 and wire wrap 85 may be combined into one auger-wrap element and the auger-wrap detached from object 50 or platform 100 once fastening is complete. Additionally, loops, staples, wire segments and other frictional elements may be employed.

Referring to FIG. 28, in an embodiment, flight control system 132 receives inputs from external sensors 182 determining location, inertial navigation system 184 determining relative position, proximity sensors 122 detecting nearby structures and cable tags 94 (not shown), map and target coordinates 180; and provides control of trajectory, positioning, and attitude for the UAV platform (not shown). Control of trajectory, positioning, and attitude is accomplished through control of propulsion 186, aerodynamic controls 188 such as flight surfaces (not shown), and fine maneuvering algorithms 190, such as a bottom-tether control module (not shown). By comparing mapped and measured location, FCS 132 may correct or revise map and target coordinates 180. Proximity sensors 122 may interrogate target location 90 and receive back a response signal or a beacon, allowing the FCS 132 to adjust the position of platform 100 (not shown) for making contact with the cable span 96 (not shown) at target location 90.

The inertial navigation system 184 may be regarded as a subset of navigation and independent of external signals and which may include one or more of the following: an accelerometer, a gyroscope, 3D motion sensors, strain gauges for detecting payload forces vertically and/or laterally, sensors detecting contact with the outer surfaces of the platform or aerial marker, and other elements.

External sensors 182 may include one or more of the following: a GPS receiver, ground control signaling, triangulation or other location signals, an altimeter, RTK GPS, LPS, an array of possible electro-optical, light detection, and ranging sensors that provide real-time spatial awareness (previously mentioned sensors+ultrasonic rangefinder, LIDAR, stereoscopic electro/thermal/optical rangefinder (ie Intel RealSense which compares visual data with thermal data to sense depth), FLIR/Thermal imagining, and any other sensors that accomplish similar functions. Proximity sensors 122 may include electromagnetic detection of a power line, rangefinders based on laser, lidar, sonar, or infrared, a Bluetooth or RFID receiver for detecting a cable tag at a target location 90, imaging sensors, and other means for maneuvering to a target location.

Map and target coordinates 180 may include a data record of the catenary structure, the target location of markers to be installed, and/or the location of existing aerial markers. The data record may include a complete model of the planned installation layout. By comparing current and mapped locations, the installation method may self-optimize, correcting catenary maps for better accuracy, and refining FCS navigation and flight paths for greater safety and speed.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. A method for attaching an object to a wire or catenary structure, comprising:
   (a) identifying a target location on said wire or catenary structure;
   (b) attaching said object to an unmanned aerial vehicle with a flight control system;
   (c) navigating said unmanned aerial vehicle using said flight control system from ground to a location near said target location;
   (d) positioning said unmanned aerial vehicle using said flight control system to a position such that said object can contact said target location;
   (e) fastening said object to said wire or catenary structure using said flight control system;
   (f) testing that said object is securely fastened to said wire or catenary structure;
   (g) releasing said object; and
   (h) returning said unmanned aerial vehicle to the ground.

2. The method of claim 1, further comprising inspecting the attachment of said object after it is fastened to said wire or catenary structure.

3. The method of claim 1, wherein said positioning of said unmanned aerial vehicle is assisted by the use of a gimbal mount.

4. The method of claim 1, wherein said flight control system uses a real time kinematic global positioning for navigating and positioning.

5. The method of claim 1, wherein said flight control system uses a local positioning system for navigating and positioning.

6. The method of claim 1, wherein said flight control system controls stability while said unmanned aerial vehicle exerts reverse thrust.

7. The method of claim 1, wherein said flight control system controls stability while said unmanned aerial vehicle is bottom-tethered to said wire or catenary structure.

8. The method of claim 1, wherein said flight control system controls for yaw while torque acts upon said unmanned aerial vehicle.

9. The method of claim 1, wherein said object is an aerial marker.

10. The method of claim 9, wherein said aerial marker has a wedge shaped opening to assist in positioning the unmanned aerial vehicle for fastening the aerial marker.

11. The method of claim 9, wherein said aerial marker has downward facing V-guides to assist in positioning the unmanned aerial vehicle for fastening the aerial marker.

12. The method of claim 1, wherein fastening said object includes the fastening of an automatic cable fastener to secure said object in place on said wire or catenary structure.

13. The method of claim 1, wherein said flight control system uses at least one of the following sensors to assist in navigating and positioning: 3D motion sensors, an RFID interrogator identifying said target location, a laser or lidar rangefinder, an infrared sensor, or mechanical feelers.

14. The method of claim 1, wherein said unmanned aerial vehicle uses at least one of the following to assist in fastening said object: an imaging device detecting fastening, an electrical signal indicating fastening, a signal from the flight control system indicating fastening, a strain gauge indicating fastening.

15. The method of claim 1, wherein said unmanned aerial vehicle uses at least one of the following to assist in fastening said object: automatic mechanical latch, automatic magnetic latch, an electrically-controlled latch, an automated screwdriver, an automated socket wrench, a take-up wire spool, a gravity-actuated clasp, a spring-driven clamp, screwing together sleeved semi-spheres or hemispheres, driving a geared winch, closing a grapple, automated mechanical wire grips, pressurized air, an exploding bolt which releases an automatic fastening action, applying adhesive, activating a servo, activating a solenoid.

16. A unmanned aerial vehicle comprising:
a flight control system;
a platform for mounting an object on a wire or catenary structure;
sensors for navigating to specific location;
a means for attaching said object to a wire or catenary structure;
a means for testing that said object is securely attached to said wire or catenary structure;
a means for releasing said object.

17. The unmanned aerial vehicle of claim 16, wherein the object is an aerial marker.

18. The unmanned aerial vehicle of claim 16, further comprising a gimbal mount.

19. The unmanned aerial vehicle of claim 16, wherein said means for attaching said object is an automatic cable fastener.

20. The unmanned aerial vehicle of claim 16, wherein said flight control system uses a real time kinematic global positioning or a local positioning system.

* * * * *